US012415182B2

(12) United States Patent
Johnson

(10) Patent No.: US 12,415,182 B2
(45) Date of Patent: Sep. 16, 2025

(54) MICROFLUIDIC CHIPS INCLUDING A GUTTER HAVING A TROUGH AND A RIDGE TO FACILITATE LOADING THEREOF AND RELATED METHODS

(71) Applicant: Pattern Bioscience, Inc., Austin, TX (US)

(72) Inventor: Ross Johnson, Austin, TX (US)

(73) Assignee: Pattern Bioscience, Inc., Austin, TX (US)

( * ) Notice: Subject to any disclaimer, the term of this patent is extended or adjusted under 35 U.S.C. 154(b) by 54 days.

(21) Appl. No.: 17/505,129

(22) Filed: Oct. 19, 2021

(65) Prior Publication Data

US 2022/0118447 A1 Apr. 21, 2022

Related U.S. Application Data

(60) Provisional application No. 63/093,774, filed on Oct. 19, 2020.

(51) Int. Cl.
*B01L 3/00* (2006.01)

(52) U.S. Cl.
CPC ... *B01L 3/502715* (2013.01); *B01L 3/502784* (2013.01); *B01L 2200/027* (2013.01); (Continued)

(58) Field of Classification Search
CPC ......... B01L 3/502715; B01L 3/502784; B01L 2200/027; B01L 2200/0605; B01L 2200/0636; B01L 2400/086
See application file for complete search history.

(56) References Cited

U.S. PATENT DOCUMENTS

RE43,122 E 1/2012 Harrison et al.
9,618,506 B2 4/2017 Lowe et al.
(Continued)

FOREIGN PATENT DOCUMENTS

WO WO 2016/063389 4/2016

OTHER PUBLICATIONS

International Search Report and Written Opinion issued in Corresponding PCT application No. PCT/US2021/055625, dated Jan. 26, 2022.

(Continued)

*Primary Examiner* — Jill A Warden
*Assistant Examiner* — Michael Stanley Gzybowski
(74) *Attorney, Agent, or Firm* — Norton Rose Fulbright US LLP

(57) ABSTRACT

A microfluidic chip can comprise a body defining a microfluidic network having one or more inlet ports, a test volume, and one or more flow paths extending between the inlet port(s) and the test volume. Along each of the flow path(s), fluid can flow from one of the inlet port(s), through at least one droplet-generating region in which a minimum cross-sectional area of the flow path increases along the flow path, and to the test volume. The network can include a gutter disposed along at least a portion of the test volume's periphery. The gutter can have a depth along a trough that is at least 10% larger than the depth of the test volume at the periphery and a depth along a ridge disposed between the trough and the test volume that is less than the depth of the test volume at the periphery.

9 Claims, 19 Drawing Sheets

(52) U.S. Cl.
CPC .................. *B01L 2200/0605* (2013.01); *B01L 2200/0636* (2013.01)

(56) References Cited

U.S. PATENT DOCUMENTS

| | | | | |
|---|---|---|---|---|
| 9,687,847 | B1 * | 6/2017 | Lutti | B01L 3/502761 |
| 10,486,155 | B1 | 11/2019 | Arab et al. | |
| 11,198,127 | B2 * | 12/2021 | Sulchek | C12M 35/04 |
| 2011/0180571 | A1 * | 7/2011 | Srinivasan | B01L 3/502792 222/420 |
| 2019/0314819 | A1 | 10/2019 | Johnson | |
| 2020/0197931 | A1 | 6/2020 | Johnson | |
| 2020/0263237 | A1 | 8/2020 | Arab et al. | |
| 2021/0053064 | A1 | 2/2021 | Johnson | |

OTHER PUBLICATIONS

Extended European Search Report issued in Corresponding European Application No. 21883702.9, dated Oct. 22, 2024.

* cited by examiner

MICROFLUIDIC CHIPS INCLUDING A GUTTER HAVING A TROUGH AND A RIDGE TO FACILITATE LOADING THEREOF AND RELATED METHODS

CROSS-REFERENCE TO RELATED APPLICATION

This application claims priority to U.S. Provisional Patent Application No. 63/093,774 filed Oct. 19, 2020, which is incorporated herein by reference in its entirety.

FIELD OF INVENTION

The present invention relates generally to microfluidic chips and, more particularly but without limitation, to droplet-generating microfluidic chips defining one or more networks, each having a test volume and a gutter that can receive droplets from the test volume.

BACKGROUND

Microfluidic chips have gained increased use in a wide variety of fields, including cosmetics, pharmaceuticals, pathology, chemistry, biology, and energy. A microfluidic chip typically has one or more channels that are arranged to transport, mix, and/or separate one or more samples for analysis thereof. At least one of the channel(s) can have a dimension that is on the order of a micrometer or tens of micrometers, permitting analysis of comparatively small (e.g., nanoliter or picoliter) sample volumes. The small sample volumes used in microfluidic chips provide a number of advantages over traditional bench top techniques. For example, more precise biological measurements, including the manipulation and analysis of single cells and/or molecules, may be achievable with a microfluidic chip due to the scale of the chip's components. Microfluidic chips can also provide improved control of the cellular environment therein to facilitate experiments related to cellular growth, aging, antibiotic resistance, and the like. And, microfluidic chips, due to their small sample volumes, low cost, and disposability, are well-suited for diagnostic applications, including identifying pathogens and point-of-care diagnostics.

In some applications, microfluidic chips are configured to generate droplets to facilitate analysis of a sample. Droplets can encapsulate cells or molecules under investigation to, in effect, amplify the concentration thereof and to increase the number of reactions. Droplet-based microfluidic chips may accordingly be well-suited for high throughput applications, such as chemical screening and PCR.

The test volume of a chip's microfluidic network is traditionally loaded with a sample by increasing pressure at the network's inlet port to above ambient pressure such that the sample flows to the test volume. These microfluidic chips generally must equalize pressure between the test volume and the ambient environment after droplet formation, such as by allowing at least a portion of the liquid to exit through a second port. To prevent droplet loss during pressure equalization, these chips may require additional mechanisms to retain droplets in the test volume. In many chips, the droplets in the test volume preferably form a two-dimensional array in which there is minimal droplet overlap, stacking, and/or compression to facilitate the analysis thereof. For example, droplets may be harder to distinguish from one another when they are overlapped, stacked, and/or compressed.

The test volume may have a droplet capacity that, if exceeded, undesirably leads to overlapping, stacking, and/or compression of droplets therein, especially when the chip has a droplet retention mechanism. Attempts to mitigate such adverse effects have been largely unsatisfactory, expensive, and/or complex. For example, controlling the volume of liquid introduced into the inlet port—e.g., such that the volume can yield sufficient droplets for analysis without overloading the test volume—can be difficult and impractical. Additionally, flow control mechanisms that stop flow when the test volume's droplet capacity has been reached are typically expensive and complex.

These challenges associated with volume and flow control may be augmented when loading multiple microfluidic networks simultaneously. In these situations, one of the networks' test volume may reach its capacity before the other(s) because a larger volume of liquid may have been introduced into that network's inlet port and/or the test volume may have a different droplet capacity. If not independently controlled, the at-capacity test volume may continue to receive droplets as loading of the partially-loaded test volume(s) is completed, which can yield the undesired overlapping, stacking, and/or compression of droplets. Preventing such volume mismatches can become particularly difficult as the number of microfluidic networks increases. And the expense and complexity of flow control may also increase with the number of microfluidic networks because such systems may require independent flow control over each of the networks.

Additionally, droplet movement in the test volume is preferably mitigated during the analysis thereof such that the droplets can be tracked; droplet tracking can be difficult when, for example, a substantial portion of the droplets appear similar and do not remain stationary. Droplet buoyancy may cause droplet movement by urging the droplets toward a portion of the microfluidic network that is disposed above the test volume (e.g., an outlet port), particularly when the chip is disposed on a surface that is inclined. While buoyancy-induced movement can be mitigated by positioning the chip such that the test volume surface on which the droplets rest is horizontal, it may be impractical to do so because the apparatuses for loading chips and/or the surfaces that such apparatuses rest upon are often not perfectly level. Even a slight incline can cause droplet movement that can make droplet tracking more difficult.

SUMMARY

Accordingly, there is a need in the art for microfluidic chips that can effectively—and in a simple, cost-effective manner—mitigate the overlapping, stacking, and/or compression of droplets that may result when a test volume continues to be loaded with droplets after reaching its droplet capacity, while mitigating droplet movement in the test volume during droplet analysis. The present chips can address this need through the use of a gutter that is disposed along at least a portion of a periphery of the test volume. The gutter can include a trough along which the gutter has a depth that is at least 10% larger than the depth of the test volume at the periphery. In this manner, and unlike conventional chips, the gutter can provide a relatively large area through which droplets can exit the test volume such that the rate of droplet removal can be similar to or larger than the rate at which additional droplets enter the test volume when the test volume's droplet capacity is reached. Droplet overlapping, stacking, and/or compression may thus be mitigated even when additional droplets are introduced into the at-capacity test volume. Accordingly, the gutter can facilitate formation of a two-dimensional array of droplets that promotes accurate analysis thereof—whether loading a single microfluidic network or multiple microfluidic networks at the same time—without the need for precise, expensive, and/or complex volume and flow control.

To mitigate droplet movement when the droplet array is formed, the gutter can include a ridge disposed between the trough and the test volume. A depth of the gutter along the ridge can be less than the depth of the test volume at the periphery such that the ridge obstructs droplet movement across the trough. Such obstruction may prevent buoyancy forces from urging droplets into the trough from the test volume when the chip is inclined. Nevertheless, during loading, the forces exerted on the droplets (e.g., from the pressure differential between the inlet port(s) and test volume) can be sufficient to squeeze droplets through the ridge and into the trough. The ridge can thus allow excess droplets to exit the test volume during loading such that droplet overlapping, stacking, and/or compression is mitigated as described above, while impeding droplet egress after loading to mitigate droplet movement during the analysis thereof.

Some of the present microfluidic chips comprise a body and a microfluidic network defined by the body, the network including one or more inlet ports, and some of the present methods comprise disposing a liquid within a first one of one or more inlet ports of a microfluidic network. In some embodiments, the network includes one or more inlet ports, a test volume, and one or more flow paths extending between the inlet port(s) and the test volume. In some embodiments, along each of the flow path(s) fluid is permitted to flow from one of the inlet port(s), through at least one droplet-generating region in which a minimum cross-sectional area of the flow path increases along the flow path, and to the test volume. Some methods comprise directing at least a portion of the liquid along a first one of the flow path(s) such that the portion of the liquid flows from the first inlet port, through at least one droplet-generating region in which a minimum cross-sectional area of the first flow path increases along the first flow path, and to the test volume.

In some embodiments, the network includes a gutter disposed along at least a portion, optionally at least a majority, of a periphery of the test volume such that fluid from the flow path(s) is not permitted to flow into the gutter without flowing through the test volume. In some embodiments, the gutter is disposed along at least a portion of the periphery of the test volume such that the gutter spans at least a majority of the width of the test volume and/or spans at least a majority of the length of the test volume. The width of the test volume and the length of the test volume, in some embodiments, are each at least 10 times a maximum depth of the test volume. The depth of the test volume, in some embodiments, is substantially the same across the test volume. The gutter, in some embodiments, includes a trough and a ridge disposed between the trough and the test volume. In some embodiments, the gutter is disposed along at least a portion of the periphery of the test volume such that fluid from the flow path(s) is not permitted to flow into the trough without flowing across the ridge. In some embodiments, along the trough the gutter has a depth that is at least 10%, optionally at least 90%, larger than the depth of the test volume of the periphery. In some embodiments, a depth of the gutter along the ridge is less than the depth of the test volume at the periphery, optionally 90% or less or 80% or less of the depth of the test volume at the periphery and/or at least 50% or at least 60% of the depth of the test volume at the periphery. In some embodiments, the network includes one or more outlet ports in fluid communication with the trough such that fluid is permitted to flow from the trough to the outlet port(s) without flowing through the test volume.

In some methods, directing at least a portion of the liquid along the first flow path is performed such that droplets are formed from the portion of the liquid, are directed to the test volume, at least one of the droplets flows from the test volume, across the ridge, and into the trough, and, optionally, to one of the outlet port(s). In some embodiments, during direction at least a portion of the liquid along the first flow path, a bottom wall of the test volume is inclined relative to a horizontal plane by an angle of at least 2.5 degrees, optionally at least 4 degrees, in a direction toward the gutter.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

FIG. 1G illustrates the microfluidic networks defined by the chip.

FIG. 2 illustrates the inlet port of one of the chip's microfluidic networks and a portion of a flow path connected thereto.

FIG. 3B illustrates the relative sizes of the constricting section and an upstream channel connected to the constricting section.

FIG. 3C illustrates the geometry of the constant and expanding sections relative to the constricting section, the expanding section having a ramp defined by a single planar surface.

DETAILED DESCRIPTION

Beginning with FIGS. 1A-1H, shown is a first embodiment 10 of the present microfluidic chips. Chip 10*a* can comprise a body 14 that defines one or more—optionally two or more—microfluidic networks 18 (FIG. 1G); as shown, the chip defines multiple networks. Body 14 can be made of any suitable material and can comprise a single piece or multiples pieces (e.g., 22*a* and 22*b*), where at least one of the piece(s) defines at least a portion of microfluidic network(s) 18. For example, as shown body 14 of chip 10*a* comprises two pieces 22*a* and 22*b*, where at least one of the pieces can comprise a (e.g., rigid) polymer and, optionally, one of the pieces can comprise a polymeric film.

Figure 1A:
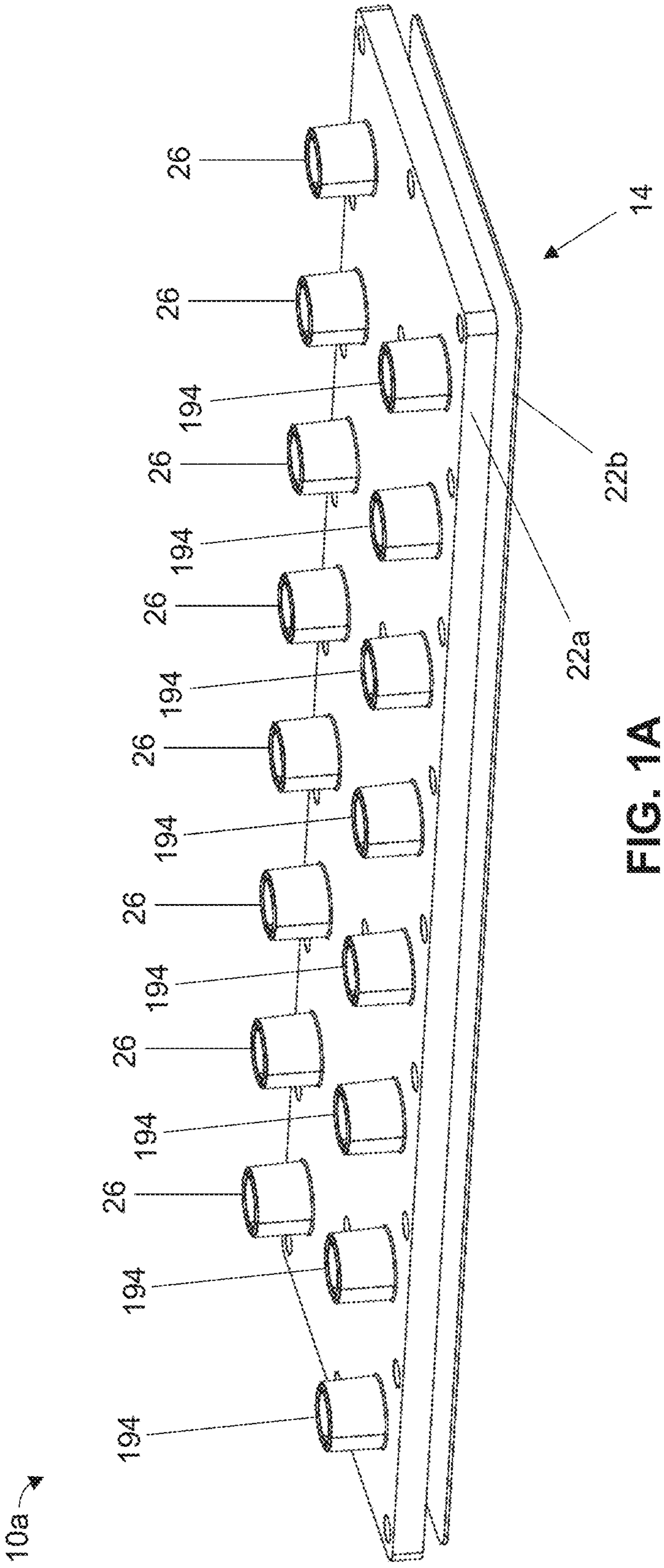
FIG. 1A is an exploded perspective view of one of the present microfluidic chips having a body that defines multiple microfluidic networks. Each of the microfluidic networks is configured to generate droplets that can be collected in a test volume of the network.
Figures 1B, 1C, 1D, 1E, 1F:
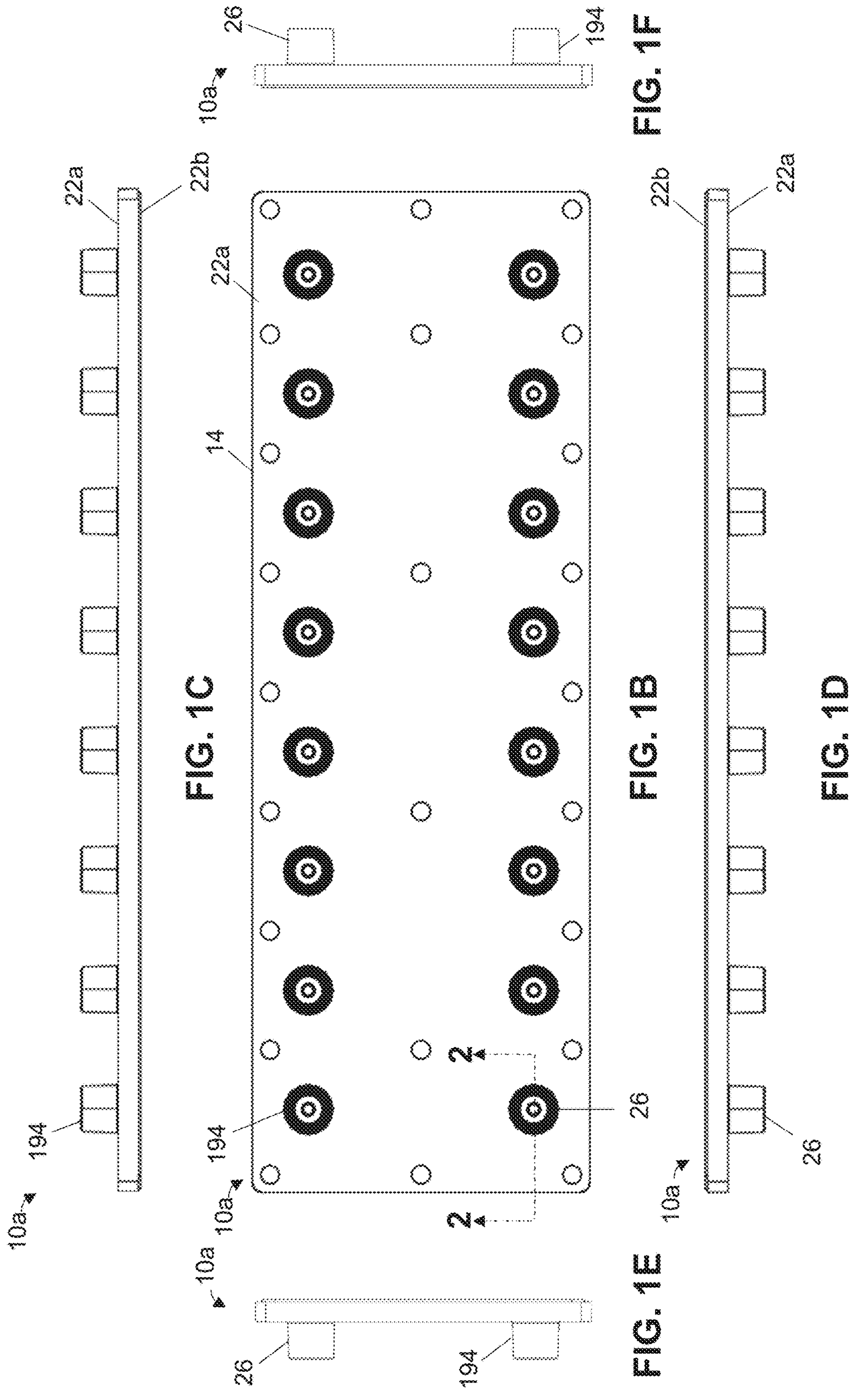
FIG. 1B is a top view of the chip of FIG. 1A showing the inlet and outlet ports thereof.
FIGS. 1C-1F are left, right, front, and back views, respectively, of the chip of FIG. 1A.
Figure 1G:
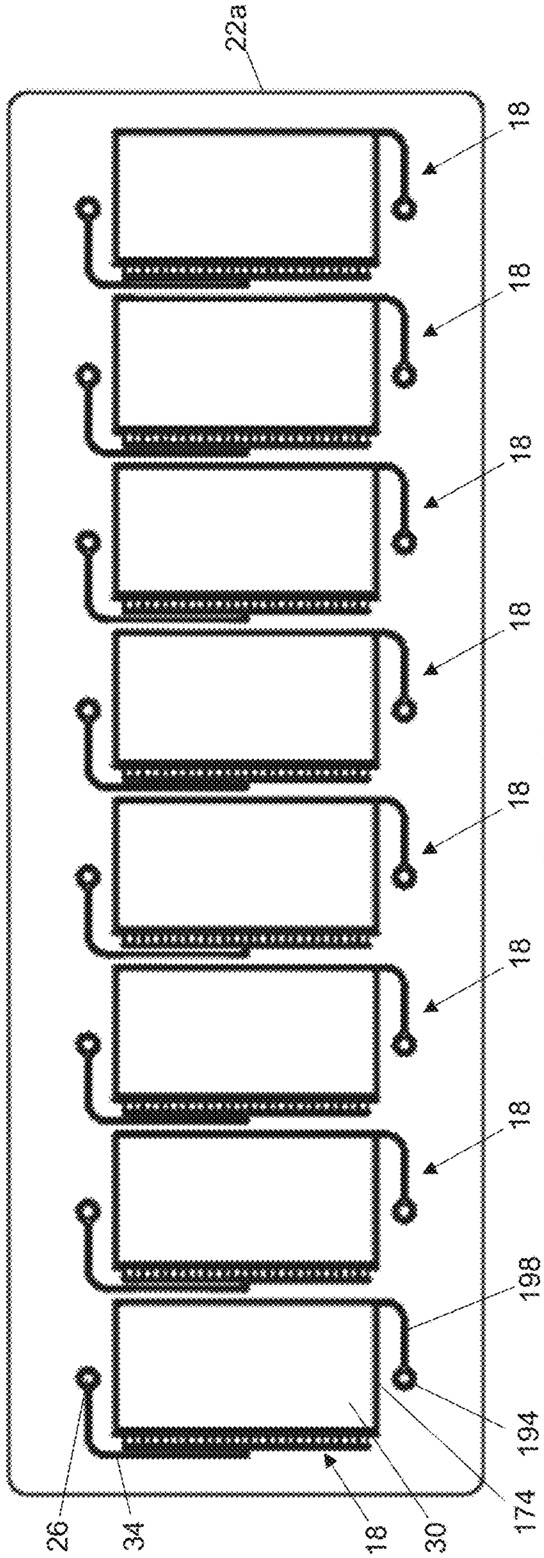
FIG. 1G is a bottom view of a first piece of the chip of FIG. 1A, with a second piece of the chip removed.
Figure 1H:
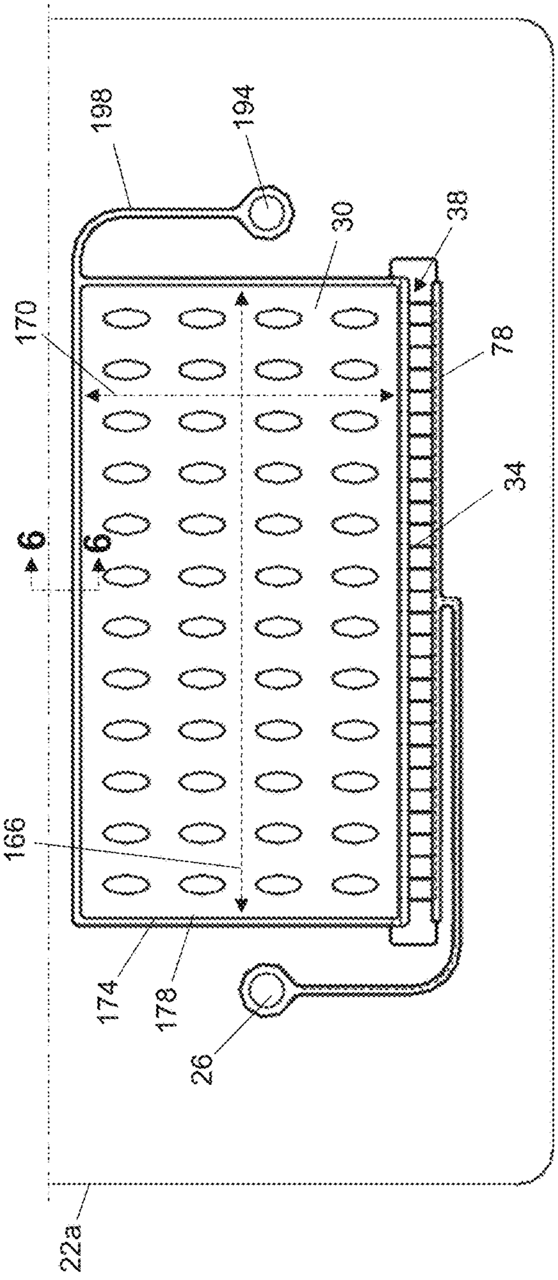
FIG. 1H is an enlarged view of one of the microfluidic networks of the chip of FIG. 1A.

Referring particularly to FIG. 1H, which shows one of microfluidic network(s) 18 of chip 10*a*, each of the network(s) can include a test volume 30 configured to receive liquid (e.g., droplets) for analysis. For example, chip 10*a* can be configured to permit identification of a pathogen encapsulated within microfluidic droplets disposed in test volume 30. In other embodiments, however, chip 10*a* can be used for any other suitable microfluidic application, such as, for example, DNA analysis, pharmaceutical screening, cellular experiments, electrophoresis, and/or the like.

To permit loading of test volume 30, each of microfluidic network(s) 18 can comprise one or more inlet ports 26, a test volume 30, and one or more flow paths 34 extending between the inlet port(s) and the test volume. Along each of flow path(s) 34, fluid can flow from one of inlet port(s) 26, through at least one droplet-generating region 38 (described in further detail below), and to test volume 30 such that droplets can be formed and introduced into the test volume for analysis. Flow path(s) 34 can be defined by one or more channels and/or other passageways through which fluid can flow. Each of flow path(s) 34 can have any suitable maximum transverse dimension to facilitate microfluidic flow, such as, for example, a maximum transverse dimension, taken perpendicularly to the centerline of the flow path, that is less than or equal to any one of, or between any two of, 2,000, 1,500, 1,000, 500, 300, 200, 100, 50, or 25 μm.

Each of microfluidic network(s) 18 can be configured to permit vacuum loading of test volume 30, e.g., by allowing gas from the test volume to be evacuated before introducing liquid therein. For example, gas evacuation can be achieved while liquid is disposed in at least one of inlet port(s) 26 by reducing pressure at the inlet port such that the gas in test volume 30 flows through at least one of flow path(s) 34, through the liquid, and out of the inlet port. The liquid can be introduced into test volume 30 (e.g., for analysis) by increasing pressure at inlet port 26 such that the liquid flows from the inlet port, through at least one of flow path(s) 34, and into the test volume.

Figure 2:
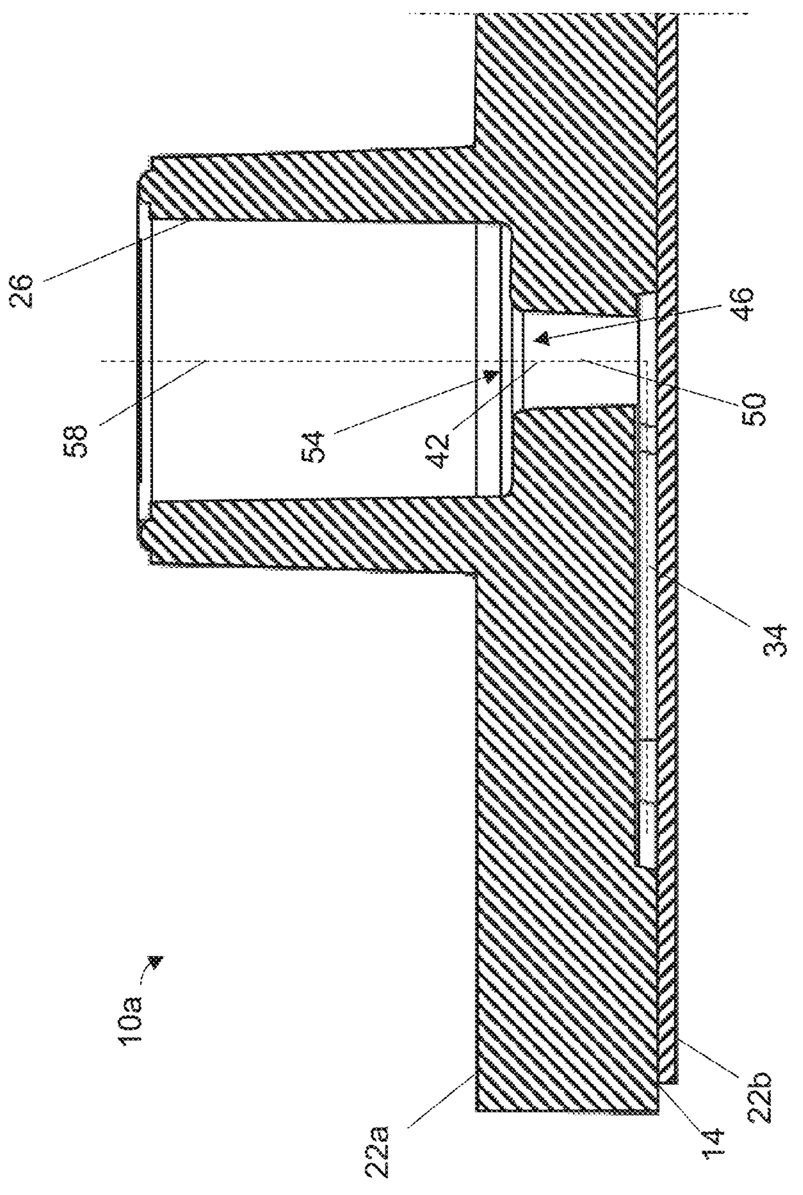
FIG. 2 is a sectional view of the chip of FIG. 1A taken along line 2-2 of FIG. 1B.

Referring additionally to FIG. 2, the relative dimensions of each of inlet port(s) 26 and a portion 42 of a flow path 34 connected thereto can facilitate bubble formation as the gas passes through the liquid and can minimize or prevent liquid losses (e.g., that may result if slug flow is produced). For example, portion 42 of flow path 34 can have a minimum cross-sectional area 46 (taken perpendicularly to centerline 50 of the portion) that is smaller than a minimum cross-sectional area 54 of inlet port 26 (taken perpendicularly to centerline 58 of the inlet port), e.g., a minimum cross-sectional area that is less than or equal to any one of, or between any two of, 90%, 80%, 70%, 60%, 50%, 40%, 30%, 20%, or 10% (e.g., less than or equal to 90% or 10%) of the minimum cross-sectional area of the inlet port. The smaller cross-sectional area of portion 42 can facilitate formation of gas bubbles having a diameter smaller than that of inlet port 26 such that slug flow and thus liquid losses are mitigated during gas evacuation. The bubbles can agitate and thereby mix liquid in inlet port 26 to facilitate loading and/or analysis thereof in test volume 30.

Droplet-generating region(s) 38 can be configured to form droplets in any suitable manner. For example, referring additionally to FIGS. 3A-3C, for each of flow path(s) 34 a minimum cross-sectional area of the flow path can increase along the flow path in at least one of droplet-generating region(s) 38. To illustrate, in a droplet-generating region 38, flow path 34 can include a constricting section 62, a constant section 66, and/or an expanding section 70.

Figure 3A:
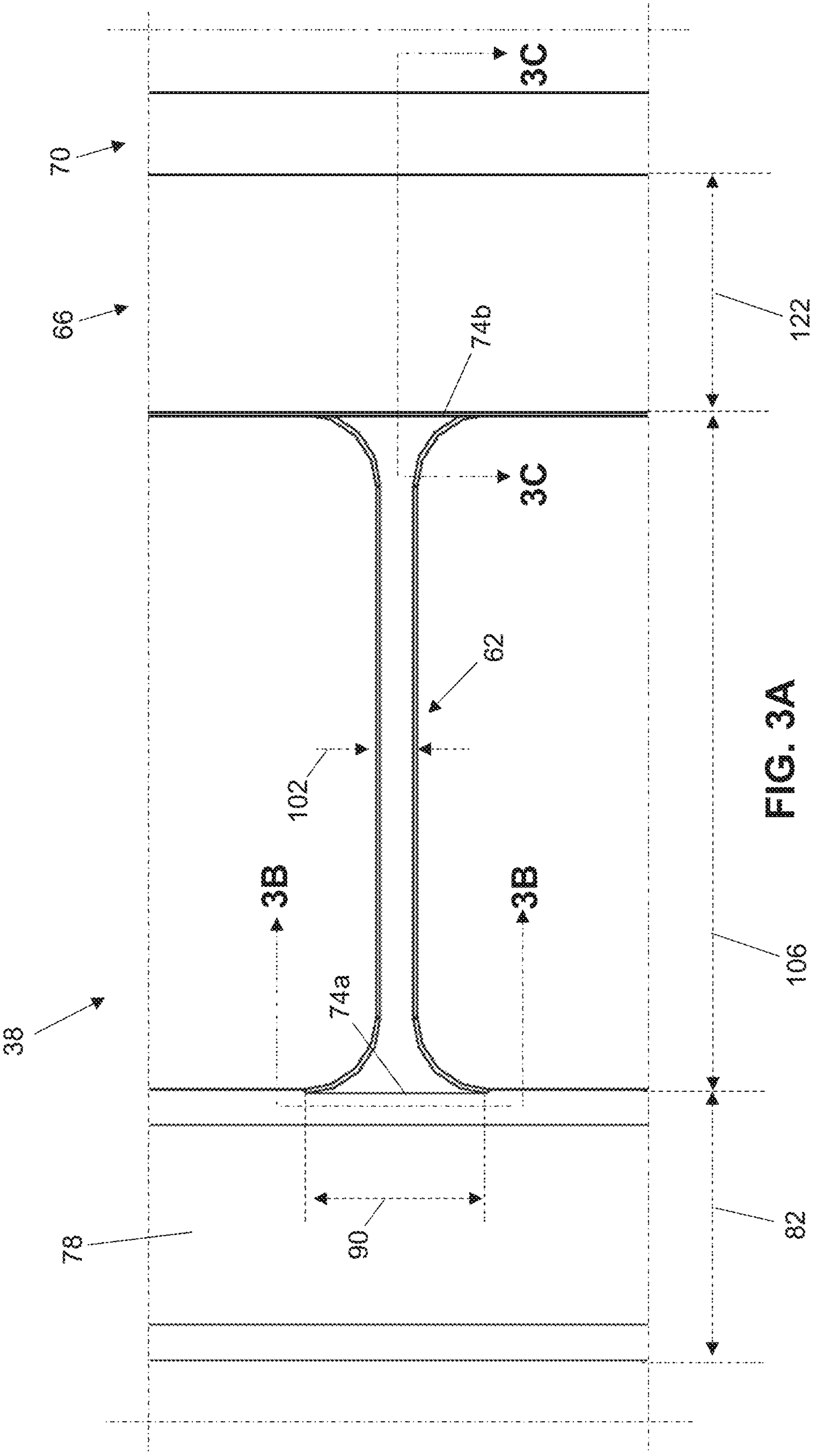
FIG. 3A is an enlarged view of one of the droplet-generating region(s) of one of the microfluidic networks of the chip of FIG. 1A. In the droplet-generating region, a flow path includes a constricting section, a constant section, and an expanding section such that a minimum cross-sectional area of the flow path increases along the flow path.
Figure 3B:
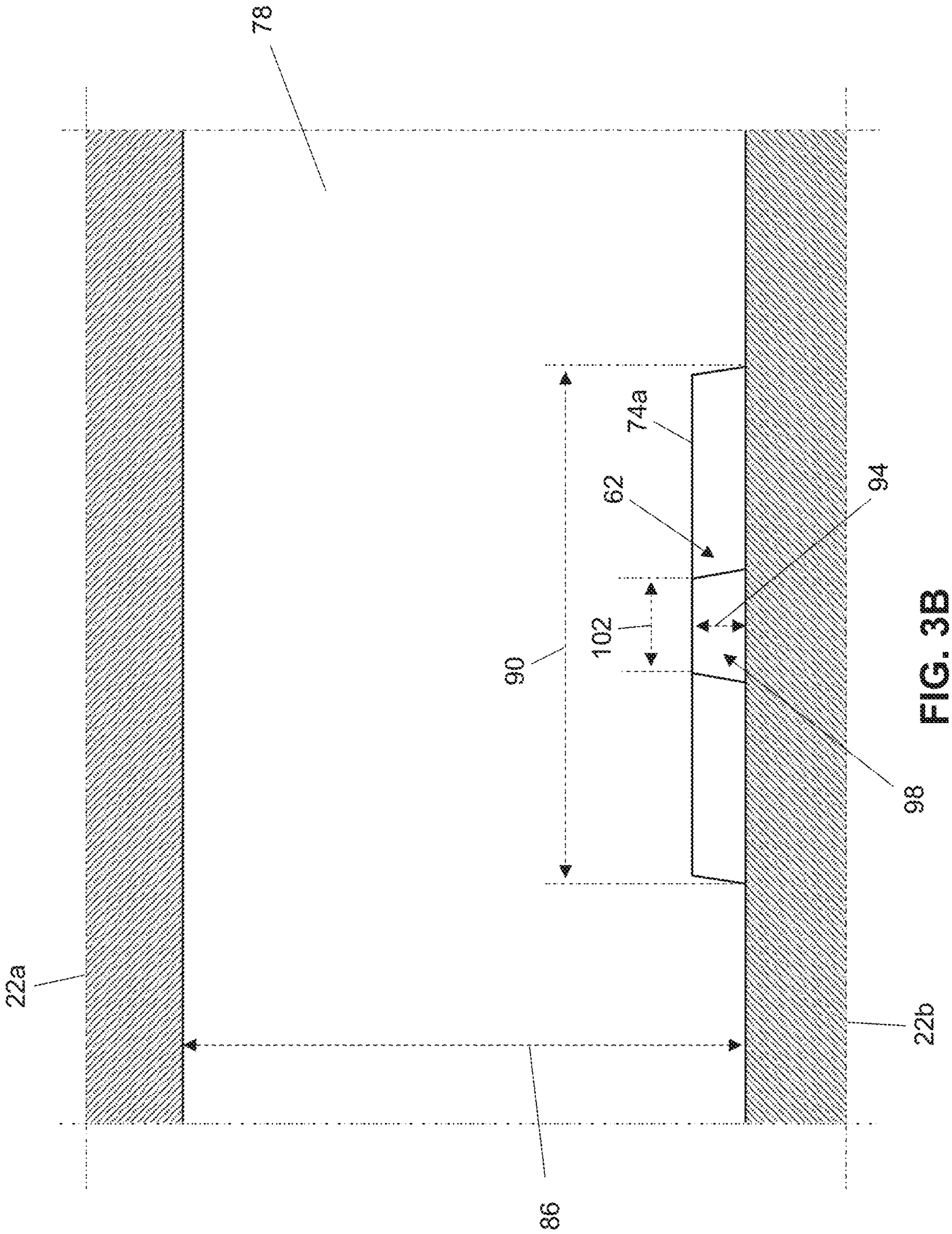
FIG. 3B is a partial sectional view of the chip of FIG. 1A taken along line 3B-3B of FIG. 3A.

Constricting section 62 can be configured to facilitate droplet generation. As shown, for example, constricting section 62 can extend between an inlet 74*a* and an outlet 74*b*, the inlet being connected to a channel 78 such that liquid can enter the constricting section from the channel (FIGS. 3A and 3B). Channel 78 can have a maximum transverse dimension 82, taken perpendicularly to the centerline of the portion of the channel, and/or a maximum depth 86, taken perpendicularly to the centerline and the transverse dimension thereof, that are larger than a maximum transverse dimension 90 and maximum depth 94, respectively, of constricting section 62. For example, at least one of channel 78's maximum transverse dimension 82 and maximum depth 86 can be greater than or equal to any one of, or between any two of, 10, 25, 50, 75, 100, 125, 150, 175, or 200 μm (e.g., between 75 and 170 μm), while constricting section 62's maximum transverse dimension 90 can be less than or equal to any one of, or between any two of, 200, 175, 150, 125, 100, 75, or 50 μm and maximum depth 94 can be less than or equal to any one of, or between any two of, 20, 15, 10, or 5 μm (e.g., between 10 and 20 μm). And, constricting section 62 can define a constriction between inlet 74*a* and outlet 74*b* at which a minimum cross-sectional area 98 of flow path 34's constricting section, taken perpendicularly to a centerline thereof, can be smaller (e.g., at least 10% smaller) than at the inlet and/or outlet. A minimum transverse dimension 102 of constricting section 62 (e.g., at the constriction) can be less than or equal to any one of, or between any two of, 40, 35, 30, 25, 20, or 15 μm, and a length 106 of the constricting section between inlet and outlet 74*a* and 74*b* can be greater than or equal to any one of, or between any two of, 250, 300, 350, 400, 450, 500, 550, 600, 650, 700, or 750 μm (e.g., between 450 and 750 μm), which ensures constricting section 62 remains primed during droplet pinch-off.

Figure 3C:
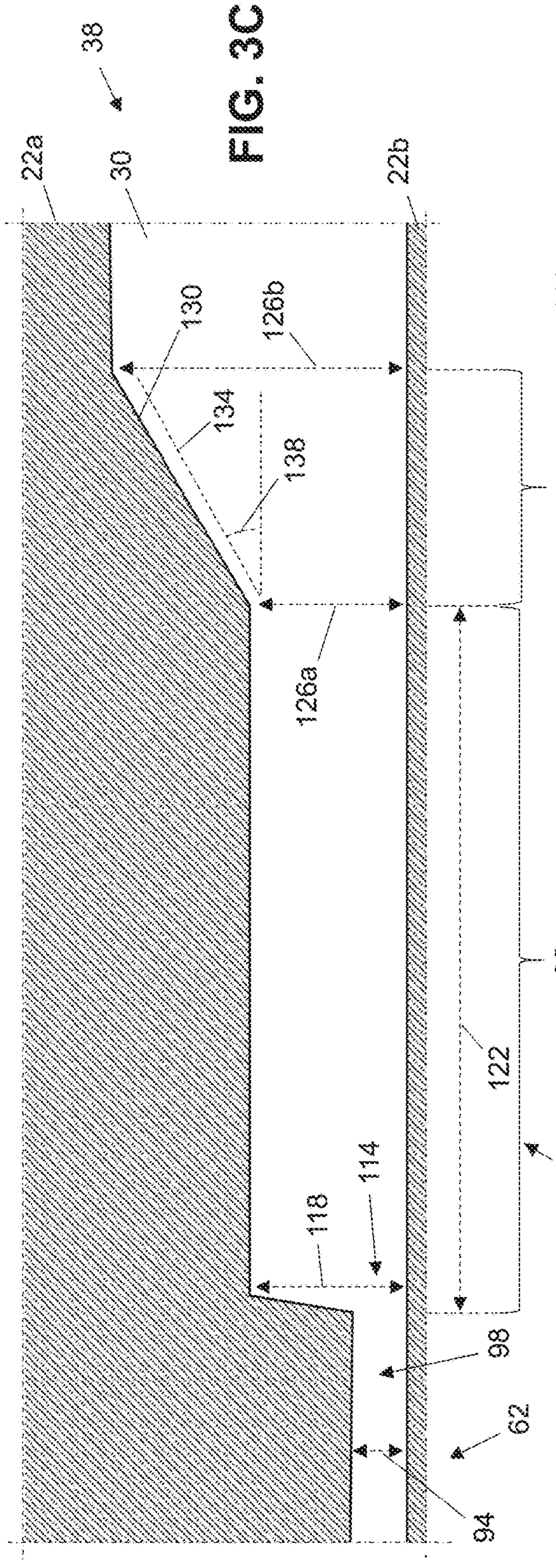
FIG. 3C is a partial sectional view of the microfluidic chip of FIG. 1A taken along line 3C-3C of FIG. 3A.

Droplet formation can be achieved by expanding liquid following constriction thereof. Along flow path 34, liquid from constricting section 62 can enter an expansion region 110 in which a minimum cross-sectional area 114 of the flow path is larger than minimum cross-sectional area 98 of the flow path in the constricting section (FIG. 3C). For example, cross-sectional area 114 can be at least 10%, 50%, 100%, 200%, 300%, 400%, 500%, or 1,000% larger than cross-sectional area 98. Such an expansion may include variations in the depth of flow path 34. A depth (e.g., 118, 126*a*, and/or 126*b*) of flow path 34 in expansion region 110 can be at least 10%, 50%, 100%, 150%, 200%, 250%, or 400% larger than maximum depth 94 of constricting section 62, such as, for example, greater than or equal to any one of, or between any two of, 5, 15, 30, 45, 60, 75, 90, 105, or 120 μm (e.g., between 35 and 45 μm or between 65 and 85 μm). Liquid flowing along flow path 34 from constricting section 62 to expansion region 110 can thereby expand and form droplets.

These depth variations can occur in a constant section 66 and/or an expanding section 70 of flow path 34, where liquid flowing from one of inlet port(s) 26 to test volume 30 is permitted to exit constricting section 62 into the constant and/or expanding sections. In the embodiment shown in FIG. 3C, expansion of the liquid can be achieved with both a constant section 66 and an expanding section 70, the geometry of which can promote the formation of droplets of substantially the same size and facilitate a suitable droplet arrangement in test volume 30. Constant section 66 and expanding section 70 can be arranged such that fluid flowing from one of inlet port(s) 26 to test volume 30 is permitted to flow from constricting section 62, through the constant section, and to the expanding section. Constant section 66 can have a depth 118 that can be equal to the minimum depth of expansion region 110 and is larger (e.g., at least 10% or at least 50% larger) than maximum depth 94 of constricting section 62, such as greater than or equal to any one of or between any two of 5, 20, 35, 50, 65, or 80 μm (e.g., between 35 and 45 μm). Depth 118 of constant section 66 can be substantially the same along at least 90% of a length 122 thereof between constricting section 62 and expanding section 70. Constant section 66 can have any suitable length 122 to permit complete droplet formation (including droplet pinch off), such as, for example, a length that is greater than or equal to any one of, or between any two of, 15, 25, 50, 100, 200, 300, 400, or 500 μm (e.g., between 150 and 200 μm).

Figure 4:
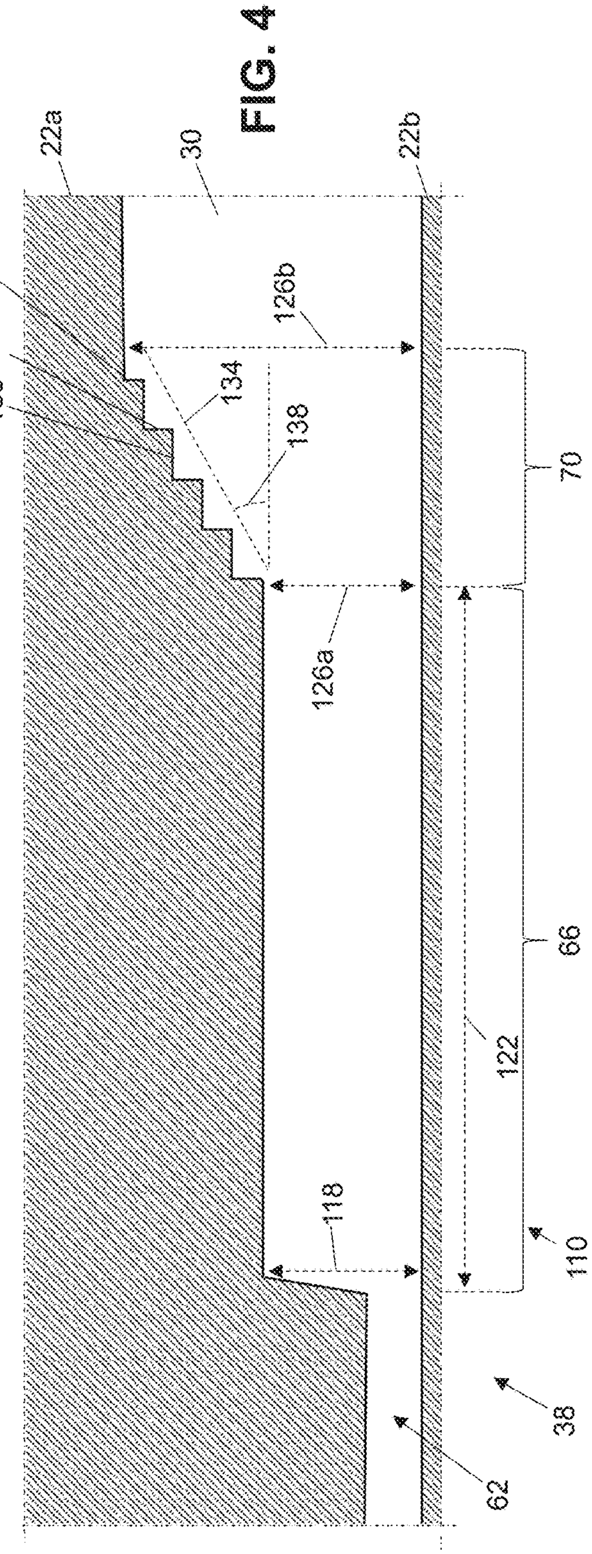
FIG. 4 is a partial sectional view of a droplet-generating region of another embodiment of the present microfluidic chips that is substantially similar to the chip of FIG. 1A, the primary exception being that the ramp of the expanding section in the FIG. 4 chip is defined by a plurality of steps.

Expanding section 70 can expand such that, moving along flow path 34 toward test volume 30, the depth of the expanding section increases from a first depth 126*a* to a second depth 126*b*. First and second depths 126*a* and 126*b* can be, for example, the minimum and maximum depths of expansion region 110, respectively. To illustrate, expanding section 70 can define a ramp 130 having a slope 134 that is angularly disposed relative to constricting section 62 by an angle 138 such that the depth of the expanding section increases moving away from the constant section. Angle 138 can be greater than or equal to any one of, or between any two of, 5°, 10°, 20°, 30°, 40°, 50°, 60°, 70°, or 80° (e.g., between 20° and 40°), as measured relative to a direction parallel to the centerline of constricting section 62. Ramp 130 can extend from constant section 66 (e.g., such that depth 126*a* is substantially the same as depth 118) to a point at which expansion region 110 reaches its maximum depth 126*b*, which can be greater than or equal to any one of, or between any two of, 15, 30, 45, 60, 75, 90, 105, or 120 μm (e.g., between 65 and 85 μm). As shown, ramp 130 is defined by a (e.g., single) planar surface. Referring to FIG. 4, however, in other embodiments ramp 130 can be defined by a plurality of steps 142 (e.g., if chip 10*a* is made with a lithographically-produced mold, which can be cost-effective), each having an appropriate rise 146 and run 150 such that the ramp has the any of the above-described slopes 134.

Figure 5A:
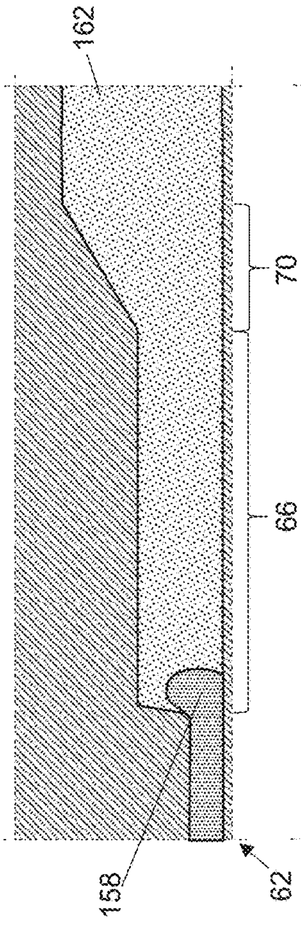
FIGS. 5A-5D illustrate droplet generation in the chip of FIG. 1A as liquid enters the constant section from the constricting section and flows to the expanding section.
Figure 5B:
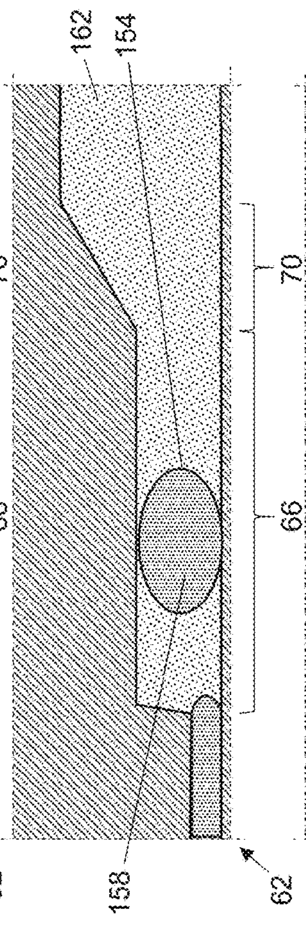
Figure 5C:
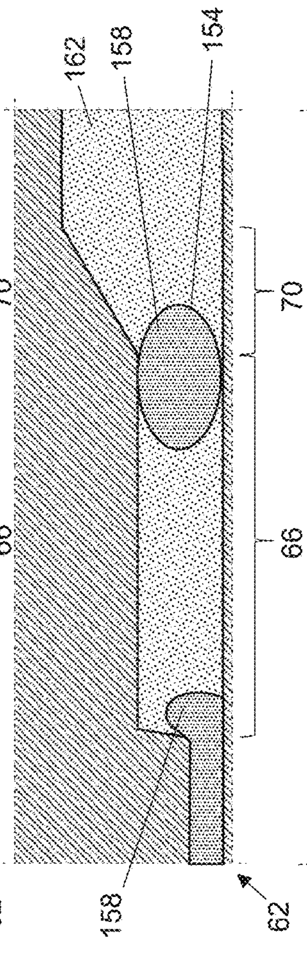
Figure 5D:
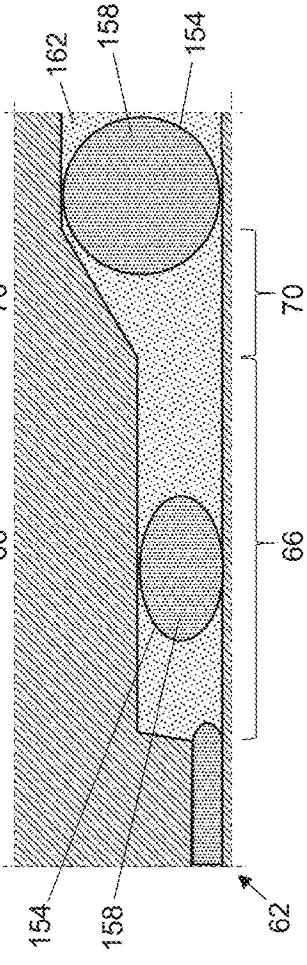

Referring additionally to FIGS. 5A-5D—which illustrate droplet formation using constricting section 62, constant section 66, and expanding section 70 as described with respect to FIG. 3C—droplets 154 can be formed from an aqueous liquid 158 in the presence of a non-aqueous liquid 162 as liquid flows from the constricting section to the constant section. As sized, constant section 66 can compress droplets 154 to prevent full expansion thereof (FIGS. 5A and 5B). Constant section 66 can thereby prevent droplets 154 from stacking on one another such that the droplets can be arranged in a two-dimensional array in test volume 30. Such an array can facilitate accurate analysis of droplets 154. A compressed droplet 154 flowing from constant section 66 to expanding section 70 can travel and decompress along ramp 130 (FIGS. 5C and 5D). The decompression can lower the surface energy of droplet 154 such that the droplet is propelled along ramp 130 and out of expanding section 70 (e.g., toward test volume 30). At least by propelling droplets 154 out of expanding section 70, ramp 130 can mitigate droplet accumulation at the interface between outlet 74*a* of constricting section 62 and constant section 66 such that droplets 154 do not obstruct subsequent droplet formation. Because such obstruction can cause inconsistencies in droplet size, expanding section 70—by mitigating blockage—can facilitate formation of consistently-sized droplets, e.g., droplets that each have a diameter within 3-6% of the diameter of each other of the droplets.

Droplet-generating region(s) 38 can have other configurations to form droplets. For example, expansion of liquid can be achieved with a constant section 66 alone, an expanding section 70 alone, or an expanding section upstream of a constant section. And in other embodiments at least one of droplet-generating region(s) 38 can be configured to form droplets via a T-junction (e.g., at which two channels—aqueous liquid 158 flowing through one and non-aqueous liquid 162 flowing through the other-connect such that the non-aqueous liquid shears the aqueous liquid to form droplets), flow focusing, co-flow, and/or the like. In some of such alternative embodiments, each of microfluidic network(s) 18 can include multiple inlet ports 26 and aqueous and non-aqueous liquids 158 and 162 can be disposed in different inlet ports (e.g., such that they can meet at a junction for droplet generation).

Due at least in part to the geometry of droplet-generating region(s) 38, droplets 154 can have a relatively low volume, such as, for example, a volume that is less than or equal to any one of, or between any two of, 10,000, 5,000, 1,000, 500, 400, 300, 200, 100, 75, or 25 picoliters (pL) (e.g., between 25 and 500 pL). Each droplet 154 can have, for example, a diameter that is less than or equal to any one of, or between any two of, 100, 95, 90, 85, 80, 75, 70, 65, or 60 μm (e.g., between 60 and 85 μm). The relatively low volume of droplets 154 can facilitate analysis of, for example, microorganisms contained by aqueous liquid 158. During droplet generation, each of one or more of the microorganisms can be encapsulated by one of droplets 154 (e.g., such that each of the encapsulating droplets includes a single microorganism and, optionally, progeny thereof). The concentration of encapsulated microorganism(s) in the droplets can be relatively high due to the small droplet volume, which may permit detection thereof without the need for a lengthy culture to propagate the microorganisms(s).

Droplets from droplet-generating region(s) 38 can flow to test volume 30, which can have a droplet capacity that accommodates sufficient droplets for analysis. For example, test volume 30 can be sized to accommodate greater than or equal to any one of, or between any two of, 1,000, 5,000, 10,000, 20,000, 30,000, 40,000, 50,000, 60,000, 70,000, 80,000, 90,000, or 100,000 droplets (e.g., between 13,000 and 25,000 droplets). To do so, test volume 30 can have a length and width 166 and 170 that are each large relative to its maximum depth 186, such as a length and width that are each at least 10, 20, 30, 40, 50, 60, 70, 80, 90, 100, 110, or 120 times as large as the test volume's maximum depth. By way of example, length 166 and width 170 can each be greater than or equal to any one of, or between any two of, 3, 4, 5, 6, 7, 8, 9, 10, 11, 12, 13, 14, 15, 16, or 17 mm; as shown, the length is larger than the width (e.g., the length is between 11 and 15 mm and the width is between 5 and 9 mm). Test volume 30's depth 186 can accommodate droplets (e.g., without compressing the droplets) while mitigating droplet stacking. Depth 186 can be, for example, greater than or equal to any one of, or between any two of, 15, 30, 45, 60, 75, 90, 105, or 120 μm (e.g., between 15 and 90 μm, such as between 65 and 85 μm) (e.g., substantially the same as maximum depth 126*b* of expansion region 110) and, optionally, can be substantially the same across test volume 30.

Figure 6:
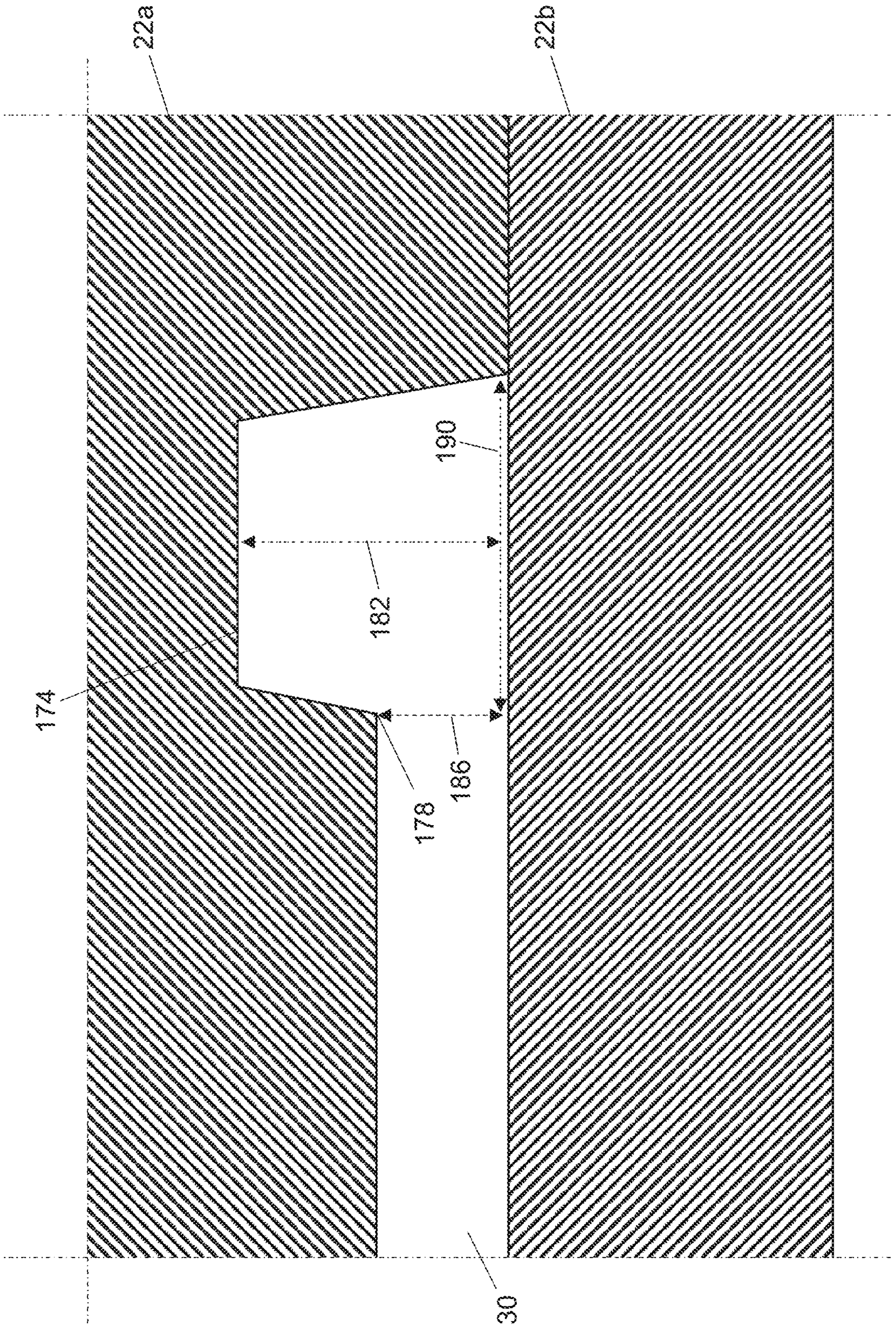
FIG. 6 is a partial sectional view of the chip of FIG. 1A taken along line 6-6 of FIG. 1H and shows a gutter disposed at the periphery of the test volume.

In conventional chips, droplets may overlap, stack, and/or compress when the test volume droplet capacity is reached, which can adversely affect the analysis thereof. For example, when using an imaging system to analyze droplets, overlapping, stacked, and/or compressed droplets may be difficult to distinguish, which can reduce the quality of information captured during the analysis. Referring to FIG. 6, each of microfluidic network(s) 18 can include a gutter 174 that can mitigate these undesired effects when test volume 30 reaches its droplet capacity. Gutter 174 can be disposed along at least a portion (e.g., along at least a majority) of a periphery 178 of test volume 30 such that fluid from flow path(s) 34 is not permitted to flow into the gutter without flowing through the test volume; this does not exclude the possibility that one or more other flow paths of the network may permit fluid to flow into the gutter without flowing through the test volume. Along gutter 174, a depth 182 of the gutter can be at least 10%, 20%, 30%, 40%, 50%, 60%, 70%, 80%, 90%, 100%, or 110% (e.g., at least 90%) larger than depth 186 of test volume 30 at periphery 178, such as, for example, greater than or equal to any one of, or between any two of, 100, 115, 130, 145, 160, 175, 190, 205, 220, 235, or 250 μm (e.g., between 140 and 160 μm). And a maximum transverse dimension 190 of gutter 174, taken perpendicularly to a centerline thereof, can be less than or equal to any one of, or between any two of, 12%, 10%, 8%, 6%, 4%, or 2% of each of length 166 and width 170 of test volume 30, such as less than or equal to any one of, or between any two of, 210, 200, 190, 180, 170, or 160 μm.

Figure 7A:
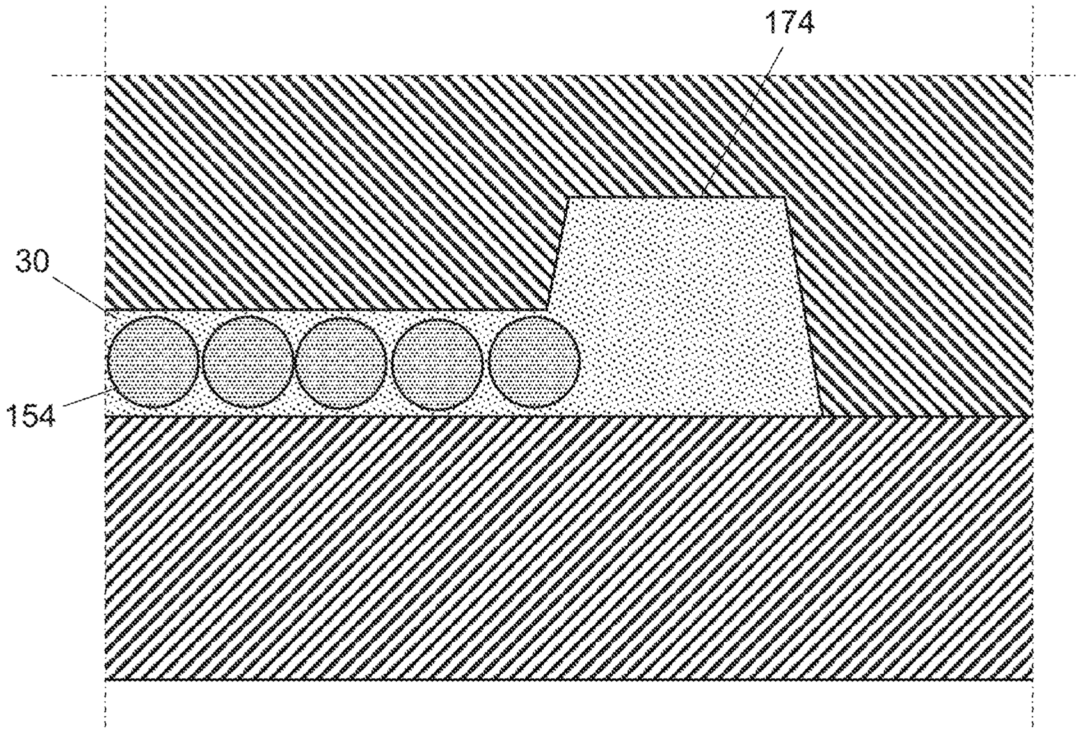
FIGS. 7A and 7B illustrate the functionality of the gutter in the chip of FIG. 1A as droplets enter the gutter from the test volume.
Figure 7B:
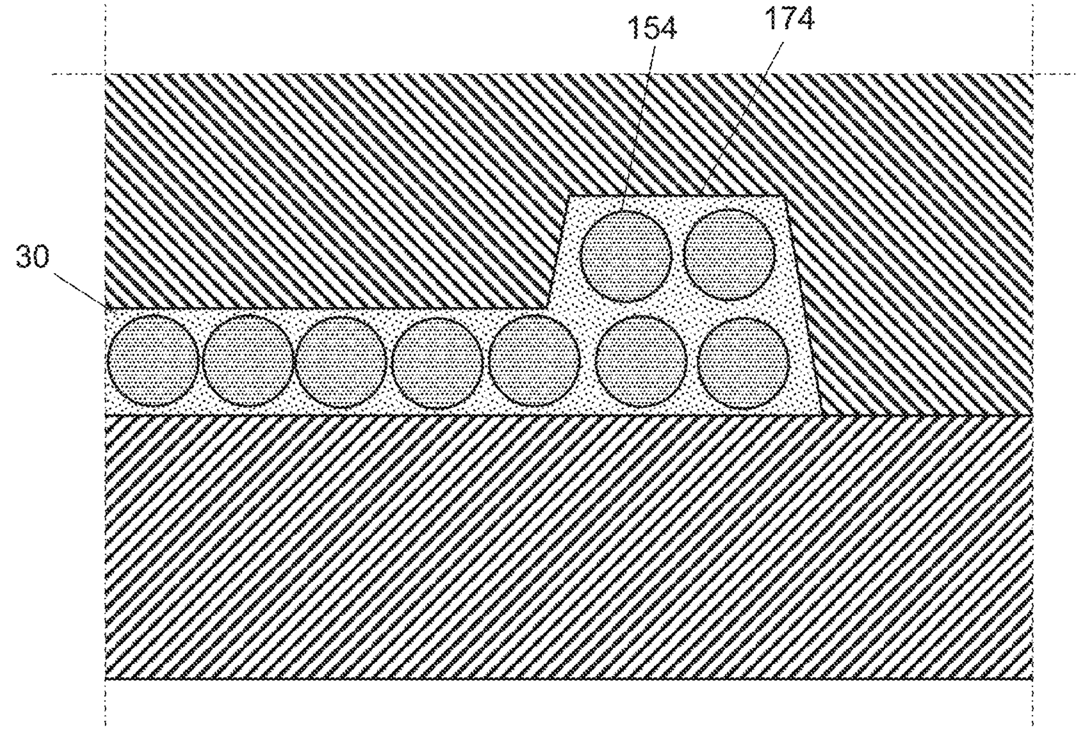

Referring additionally to FIGS. 7A and 7B—which illustrate use of gutter 174—droplets 154 in test volume 30 (FIG. 7A) can rise or fall in the gutter (e.g., due at least in part to buoyancy differences between aqueous liquid 158 and non-aqueous liquid 162) as the test volume reaches capacity (FIG. 7B). Depth 182 of gutter 174 can, but need not, increase moving away from periphery 178 of test volume 30 (e.g., until the depth reaches a maximum) to facilitate this movement. Being positioned along at least a portion (e.g., at least a majority) of periphery 178, gutter 174 can provide a relatively large area through which droplets can exit test volume 30. In this manner, the rate of droplet removal from test volume 30 can be similar to or faster than the rate at which droplets enter the test volume from droplet-generating region(s) 38 when the test volume is at capacity, thereby mitigating accumulation and thus stacking, overlapping, and/or compression of the droplets therein.

Gutter 174 can be particularly advantageous when liquid is loaded into multiple microfluidic networks 18 (e.g., when chip 10*a* has multiple networks and/or when loading multiple chips) in parallel. If different amounts of liquid are introduced in each microfluidic network 18 and/or if test volumes 30 of the networks have different droplet capacities, at least one of the test volumes may reach capacity before other test volume(s) have been fully loaded. In conventional chips, continued loading of partially-loaded test volume(s) may cause droplets in at-capacity test volume(s) to undesirably stack, overlap, and/or compress. Microfluidic networks 18 can address this issue at least because each includes a gutter 174—droplets in at-capacity test volume(s) 30 can exit at a rate sufficient to mitigate stacking, overlapping, and/or compression thereof while partially-loaded test volume(s) continue to be loaded in parallel. As such, a suitable array of droplets can be loaded into each of test volumes 30 even if the test volumes reach capacity at different times. And this parallel loading can be achieved without expensive and complex independent flow control for each of microfluidic networks 18.

Figure 8A:
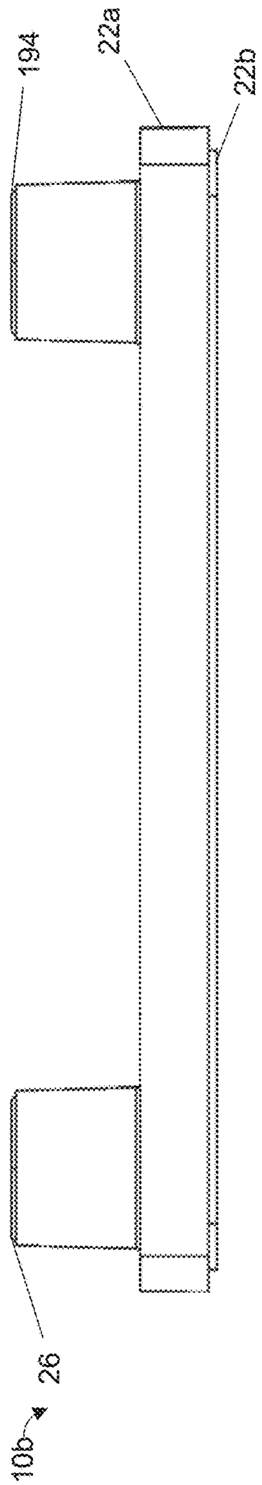
FIG. 8A is a right side view of a second embodiment of the present chips whose microfluidic network includes a gutter having a trough and a ridge.
Figure 8B:
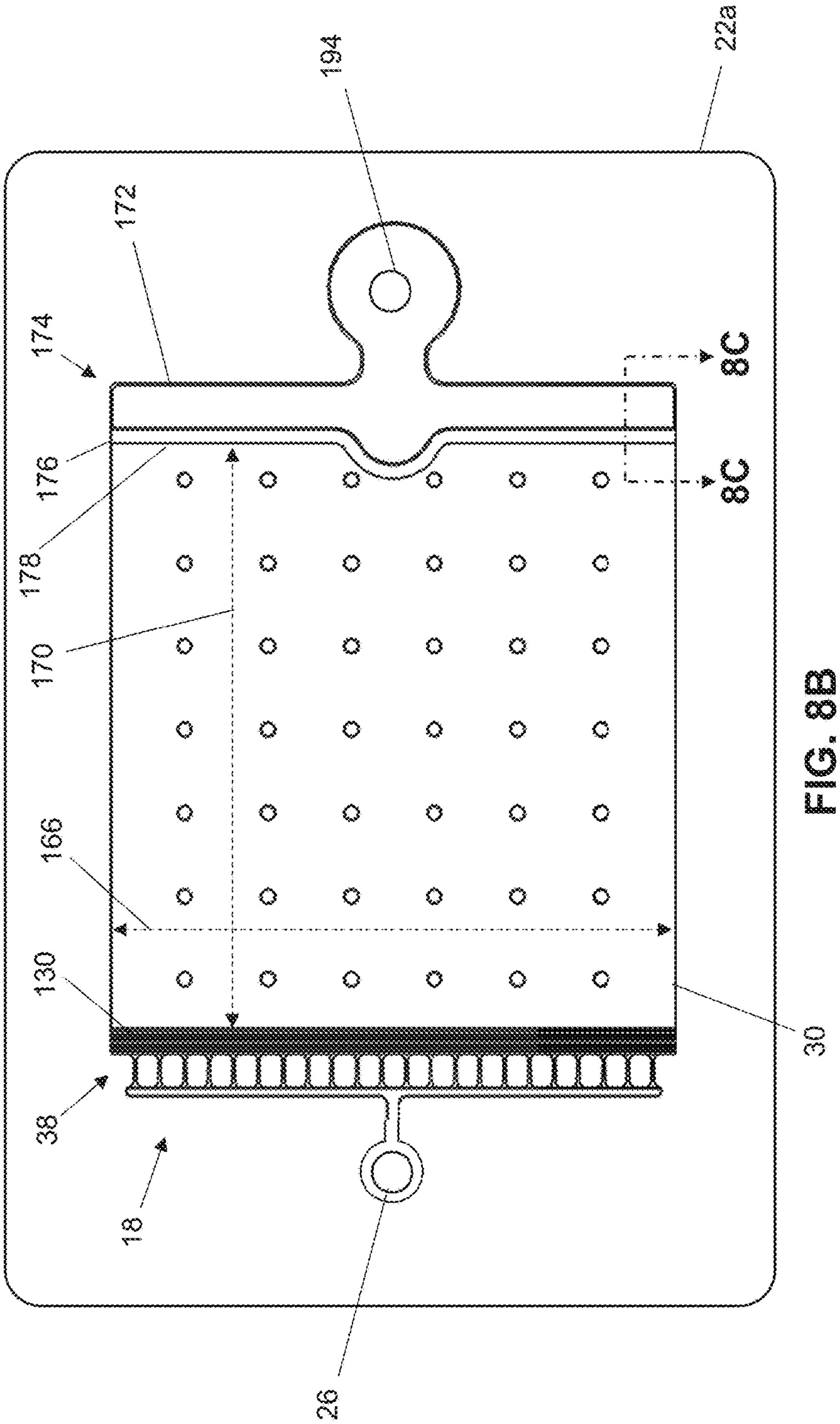
FIG. 8B is a bottom view of the first piece of the FIG. 8A chip and shows the microfluidic network thereof.
Figure 8C:
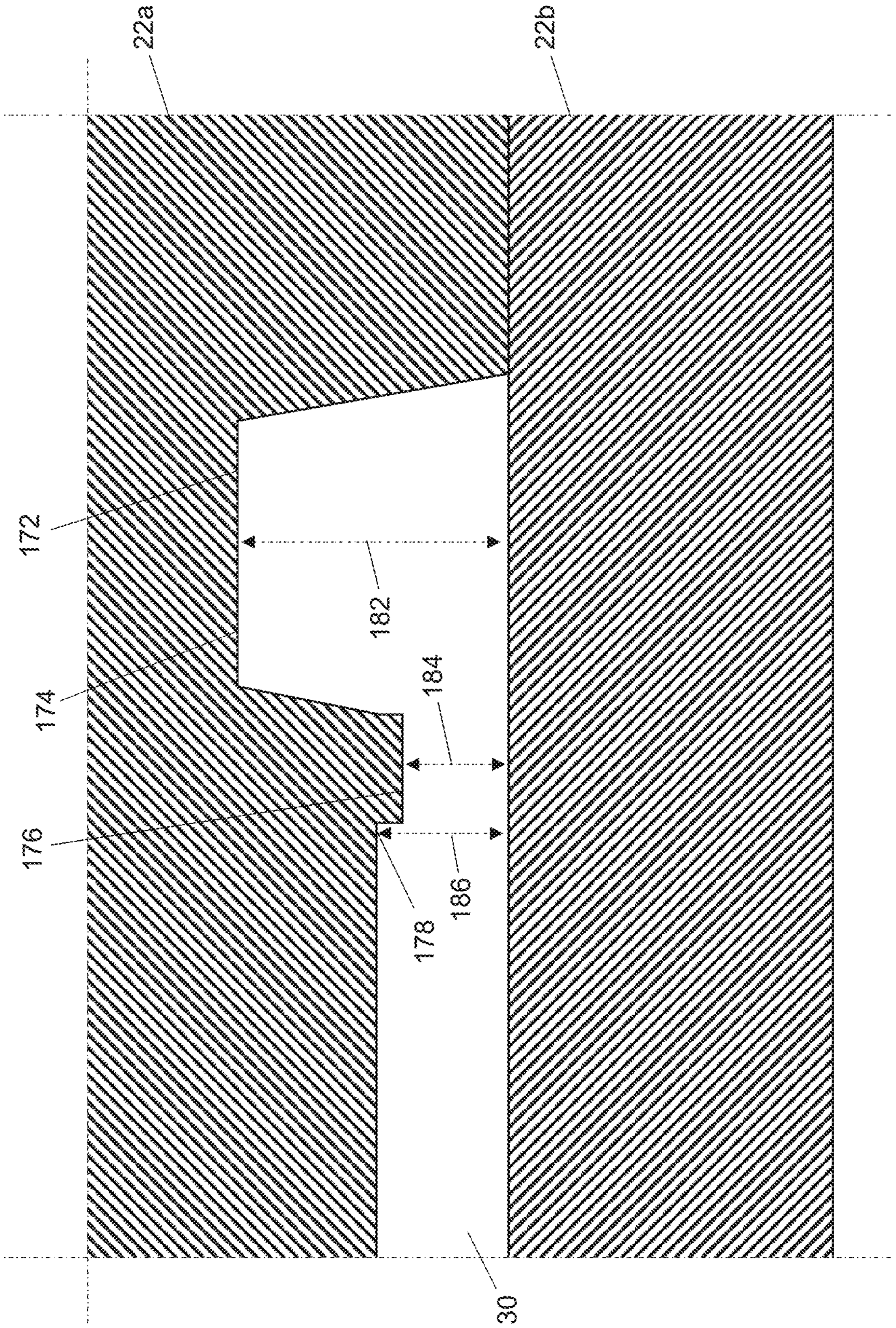
FIG. 8C is a partial sectional view of the chip of FIG. 8A taken along line 8C-8C of FIG. 8B.
Figure 9:
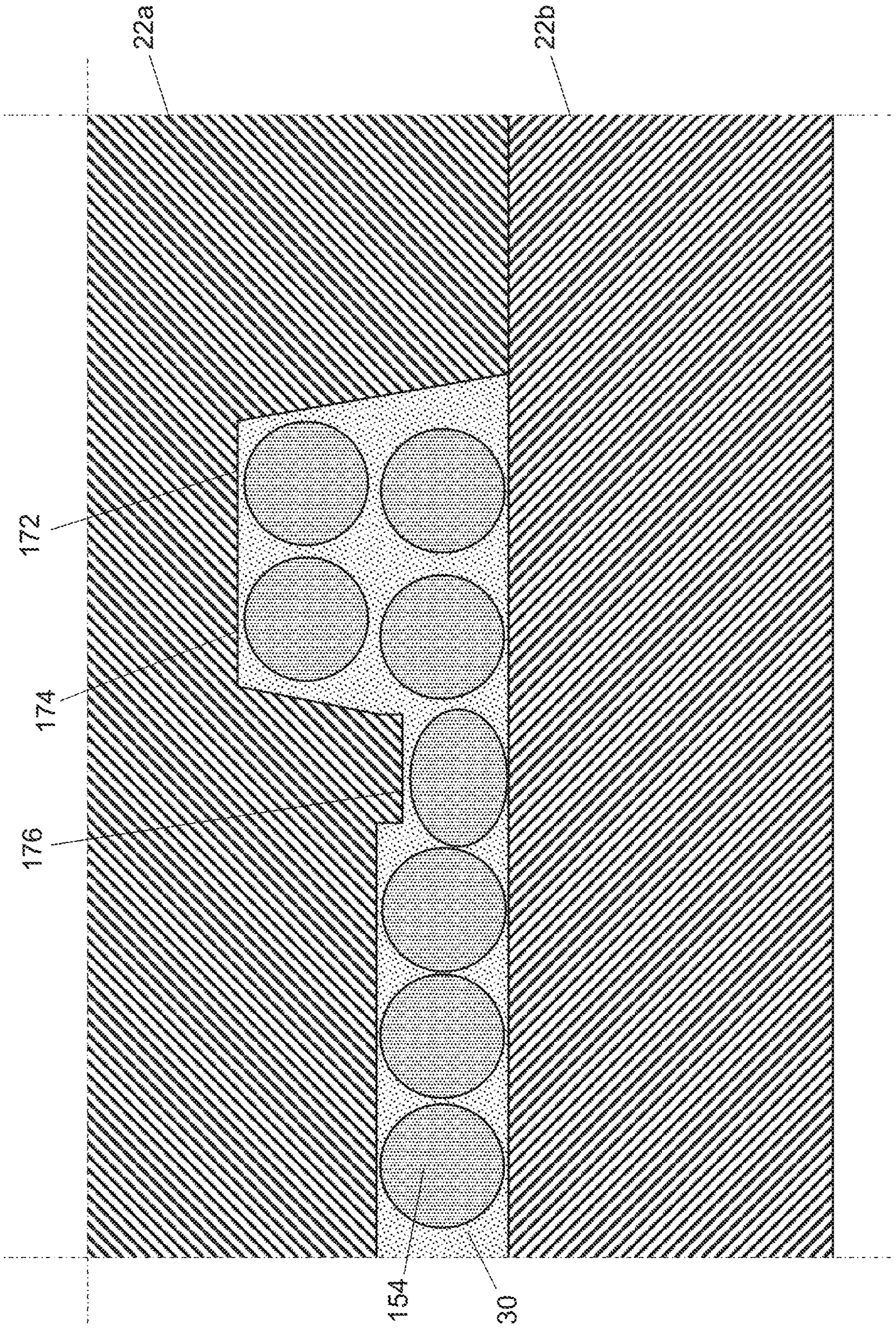
FIG. 9 illustrate the functionality of the gutter in the chip of FIG. 8A as droplets move across the gutter's ridge to enter its trough during loading.

Referring additionally to FIGS. 8A-8C, shown is a second embodiment 10*b* of the present chips that is substantially the same as chip 10*a*, one exception being that chip 10*b*'s gutter 174 includes a trough 172 and a ridge 176 that is disposed between the trough and test volume 130 (FIGS. 8B and 8C). Gutter 174 can be disposed along at least a portion of periphery 178 such that fluid from flow path(s) 34 is not permitted to flow into trough 172 without flowing across ridge 176. Gutter 174's depth 182 along trough 172 can be larger than test volume 30's depth 186 at periphery 178 (such as at least 10%, 20%, 30%, 40%, 50%, 60%, 70%, 80%, 90%, 100%, or 110% (e.g., at least 90%) larger than the test volume's depth at the periphery and/or greater than or equal to any one of, or between any two of, 100, 115, 130, 145, 160, 175, 190, 205, 220, 235, or 250 μm (e.g., between 140 and 160 μm)) to permit droplet collection therein as described above. Meanwhile, gutter 174's depth 184 along ridge 176 can be less than test volume 30's depth 186 at periphery 178. To illustrate, depth 184 can be less than or equal to any one of, or between any two of, 90%, 80%, 70%, 60%, or 50% of depth 186 (e.g., 90% or less or 80% or less), such as less than or equal to any one of, or between any two of, 90, 85, 80, 75, 70, 65, 60, 55, 50, 45, or 40 μm (e.g., less than or equal to 70 μm). In this manner, ridge 176 can impede the passage of droplets thereacross, thereby mitigating droplet movement when a two-dimensional array of droplets is formed in test volume 30. However, referring additionally to FIG. 9, during loading the forces exerted on droplets 154 (e.g., from a pressure differential between inlet port(s) 26 and test volume 30) can be sufficient to force excess droplets across ridge 176 such that they can rise or fall into gutter 174's trough 172 as described above. As shown, a droplet 154 can be compressed as it passes across ridge 176. Gutter 174's depth 184 along ridge 176 can be large enough to permit droplet passage under loading conditions, such as at least 30%, 40%, 50%, 60%, or 70% (e.g., at least 50% or at least 60%) of test volume 30's depth 184 at periphery 178. In this manner, gutter 174 can mitigate overlapping, stacking, and/or compression of droplets 154 when test volume 30 reaches capacity during loading and can also impede droplet movement (e.g., if chip 10*b* is inclined) during the analysis thereof.

As described above, gutter 174 can, but need not, be disposed along at least a majority of test volume 30's periphery 178. For example, gutter 174 can span greater than or equal to any one of, or between any two of, 20%, 30%, 40%, 50%, 60%, 70%, 80%, or 90% (e.g., at least a majority) of test volume 30's length 166 and/or of the test volume's width 170. As shown, in chip 10*b* gutter 174 spans the entirety of test volume 30's length 166 (e.g., which can be measured perpendicularly to a path that extends between at least one of droplet-generating region(s) 38 and gutter 174) such that it can receive droplets that flow across the test volume's width 170.

While as shown chip 10*b* has a single microfluidic network 18 whose expansion region 110 includes a step-defined ramp 130 for droplet formation, in other embodiments with the trough-and-ridge gutter design the chip can have multiple networks and any suitable geometries for droplet generation as described above with reference to chip 10*a*.

For both chip 10*a* and chip 10*b*, one or more outlet ports 194 can be in fluid communication with gutter 174 (e.g., with trough 172) via one or more outlet channels 198 such that fluid can flow from the gutter (e.g., from the trough) to the outlet port(s) without flowing through test volume 30. Each of outlet port(s) 194 can be substantially similar to inlet port(s) 26 (e.g., can have the same dimensions relative to a portion of an outlet channel 198 connected thereto as each of the inlet port(s) has relative to portion 42). In this manner, droplets that enter gutter 174 from test volume 30 can continue to flow to outlet port(s) 194, which can accommodate and thereby permit removal of a large volume of droplets from test volume 30 to mitigate stacking, overlapping, and/or compression thereof. In other embodiments, a chip (e.g., 10*a* or 10*b*) can include, instead of or in addition to outlet port(s) 194, one or more reservoirs that each is sealed (e.g., such that liquid cannot be introduced into the chip via the reservoir(s)) that can also receive droplets from gutter 174 via outlet channel(s) 198. For embodiments in which a chip (e.g., 10*a* or 10*b*) does not include outlet port(s) 194, the chip can be a single-port chip (e.g., in which inlet port(s) 26 consist of a single inlet port).

Figure 10:
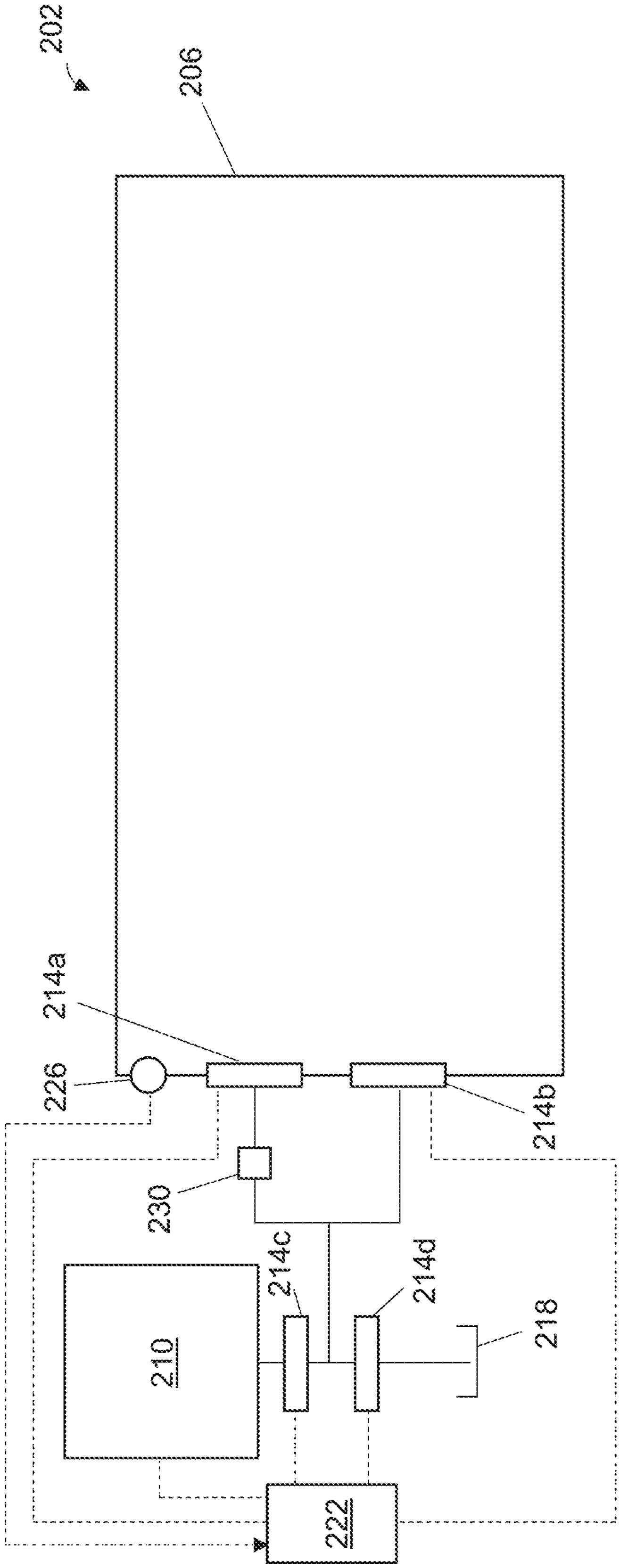
FIG. 10 is a schematic of a system comprising a vacuum chamber that can be used to change the pressure at the inlet port(s) of some of the present microfluidic chips to evacuate gas from and load liquid into the test volume of the chip. The system can include a vacuum source, one or more control valves, and a controller to adjust the rate at which a vacuum is created or vented.

Referring to FIG. 10, shown is a system 202 that can be used to load a test volume 30 of each of one or more microfluidic networks 18 of at least one of the present chips (e.g., 10*a* or 10*b*). System 202 can comprise a vacuum chamber 206 configured to receive and contain the microfluidic chip(s). A vacuum source 210 and one or more control valves (e.g., 214*a*-214*d*) can be configured to adjust the pressure within vacuum chamber 206. For example, vacuum source 210 can be configured to remove gas from vacuum chamber 206 and thereby decrease the pressure therein (e.g., to below the ambient pressure) and thus at the inlet port(s) (e.g., 26) of each of the microfluidic chip(s). The decreased pressure can facilitate gas evacuation of the microfluidic chip(s). Each of the control valve(s) can be movable between closed and open positions in which the control valve prevents and permits, respectively, fluid transfer between vacuum chamber 206, vacuum source 210, and/or and external environment 218. For example, after a vacuum is generated in vacuum chamber 206, opening at least one of the control valve(s) can permit gas to enter the vacuum chamber (e.g., from external environment 218) to increase the pressure therein (e.g., to the ambient pressure) and thus at the inlet port(s) of each of the microfluidic chip(s). The increased pressure can facilitate droplet generation and liquid loading of test volume(s) 30.

System 202 can comprise a controller 222 configured to control vacuum source 210 and/or the control valve(s) to regulate pressure in vacuum chamber 206. Controller 222 can be configured to receive vacuum chamber pressure measurements from a pressure sensor 226. Based at least in part on those pressure measurements, controller 222 can be configured to activate vacuum source 210 and/or at least one of the control valve(s), e.g., to achieve a target pressure within vacuum chamber 206 (e.g., with a proportional-integral-derivative controller). For example, the control valve(s) of system 202 can comprise a slow valve 214*a* and a fast valve 214*b*, each—when in the open position—permitting fluid flow between vacuum chamber 206 and at least one of vacuum source 210 and external environment 218. System 202 can be configured such that the maximum rate at which gas can flow through slow valve 214*a* is lower than that at which gas can flow through fast valve 214*b*. As shown, for example, system 202 comprises a restriction 230 in fluid communication with slow valve 214*a*. Controller 222 can control the rate at which gas enters or exits vacuum chamber 206—and thus the rate of change of pressure in the vacuum chamber—at least by selecting and opening at least one of slow valve 214*a* (e.g., for a low flow rate) and fast valve 214*b* (e.g., for a high flow rate) and closing the non-selected valve(s), if any. As such, suitable control can be achieved without the need for a variable-powered vacuum source or proportional valves, although, in some embodiments, vacuum source 210 can provide different levels of vacuum power and/or at least one of control valves 214*a*-214*d* can comprise a proportional valve.

The control valve(s) of system 202 can comprise a vacuum valve 214*c* and a vent valve 214*d*. During gas evacuation, vacuum valve 214*c* can be opened and vent valve 214*d* can be closed such that vacuum source 210 can draw gas from vacuum chamber 206 and the vacuum chamber is isolated from external environment 218. During liquid introduction, vacuum valve 214*c* can be closed and vent valve 214*d* can be opened such that gas (e.g., air) can flow from external environment 218 into vacuum chamber 206. Slow and fast valves 214*a* and 214*b* can be in fluid communication with both vacuum valve 214*c* and vent valve 214*d* such that controller 222 can adjust the flow rate in or out of vacuum chamber 206 with the slow and fast valves during both stages.

Figure 11A:
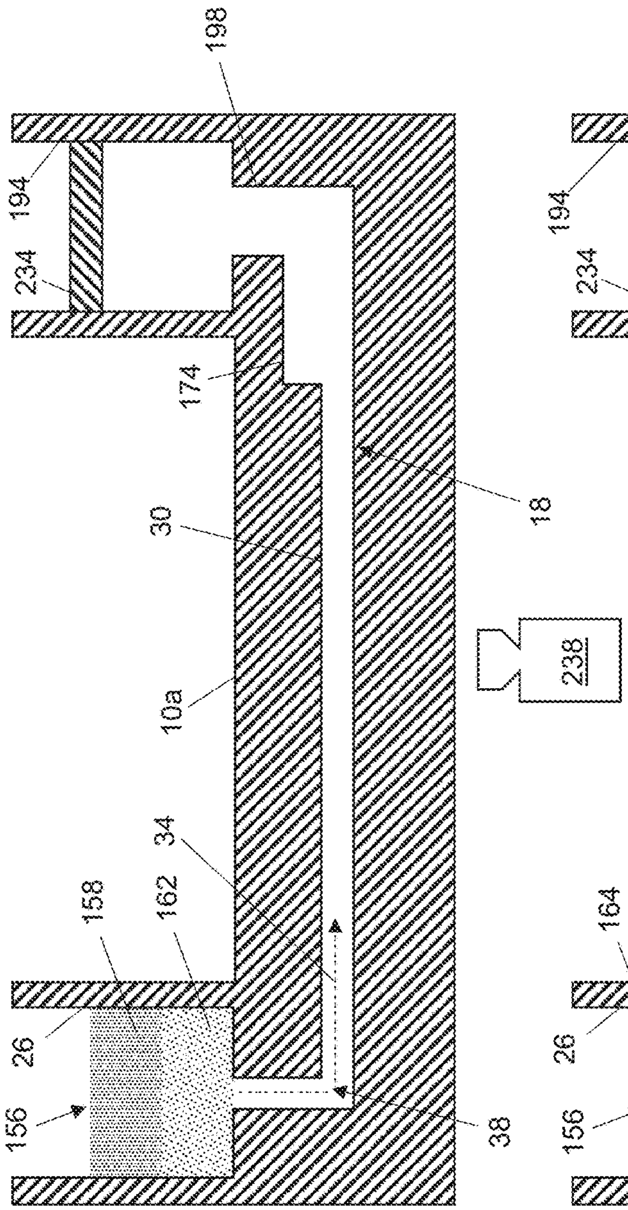
FIGS. 11A-11D are schematics illustrating some of the present methods of loading a microfluidic chip, where liquid is loaded into a port, gas is evacuated from the test volume through the liquid, and the liquid flows through at least one droplet-generating region to form droplets.

Referring to FIGS. 11A-11D, shown are schematics illustrating some of the present methods of loading a microfluidic chip (e.g., 10*a* or 10*b*), which can be any of those described above—the chip can have a body (e.g., 14) defining one or more microfluidic networks (e.g., 18), each having any of the above-described features (e.g., inlet port(s), flow path(s), a test volume, droplet-generating region(s), a gutter that optionally includes a trough and ridge, outlet channel(s), and/or outlet port(s)). For each of the network(s), some methods comprise a step of disposing a liquid (e.g., 156) within a first one of the inlet port(s) (e.g., 26) (FIG. 11A). The liquid can comprise an aqueous liquid (e.g., 158) (e.g., a liquid containing a sample for analysis, such as a pathogen and/or a medication) and a non-aqueous liquid (e.g., 162) (e.g., an oil, such as a fluorinated oil, that can include a surfactant). To promote droplet generation, the non-aqueous liquid can be relatively dense compared to water, e.g., a specific gravity of the non-aqueous liquid can be greater than or equal to any one of, or between any two of, 1.3, 1.4, 1.5, 1.6, or 1.7 (e.g., greater than or equal to 1.5).

Figure 11B:
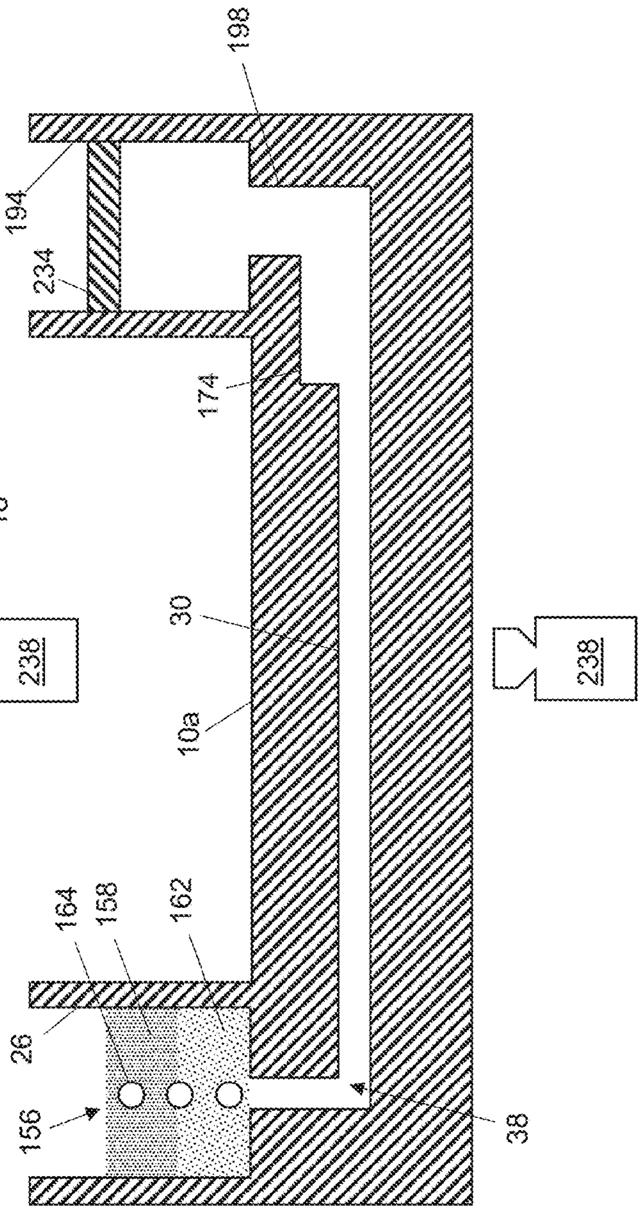
Figure 11C:
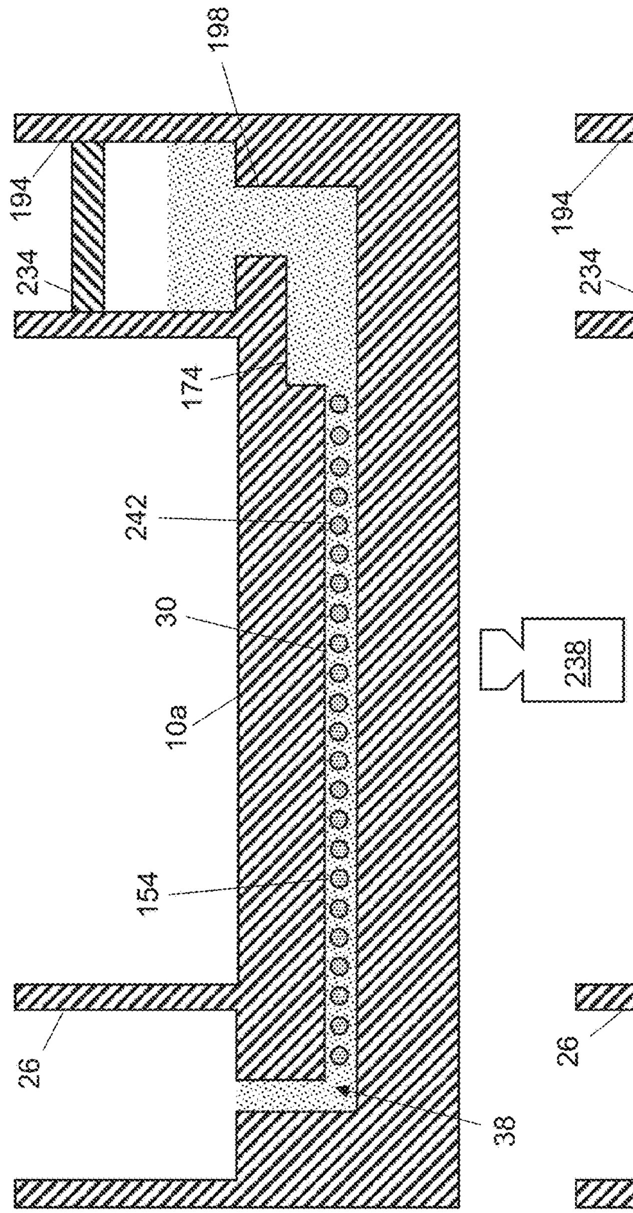
Figure 11D:
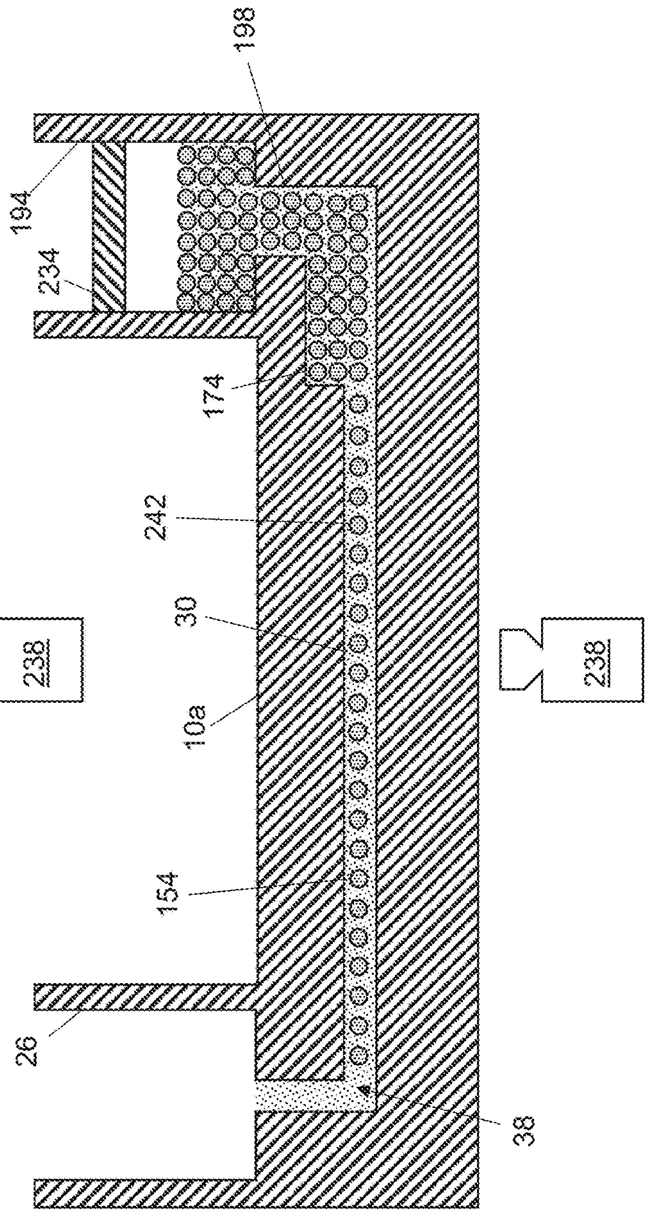

Some methods comprise, for each of the microfluidic network(s), a step of directing at least a portion of the liquid along a first one of the flow path(s) (e.g., 34) such that the portion of the liquid flows from the first inlet port, through at least one droplet-generating region (e.g., 38) (e.g., in which a minimum cross-sectional area of the first flow path increases along the first flow path), and to the test volume (e.g., 30) (FIGS. 11B and 11C). This can be achieved via vacuum loading, as discussed above. Some methods comprise, for example, a step of reducing pressure at the first port such that gas (e.g., 164) flows from the test volume, through at least one of the flow path(s), and out of the first port (FIG. 11B). Gas that flows out of the first port can pass through the liquid. As described above, the relative dimensions of the first port and the portion (e.g., 42) of a flow path connected thereto can facilitate bubble formation as the gas passes through the liquid. Advantageously, the gas bubbles can agitate and thereby mix the aqueous liquid to facilitate loading and/or analysis thereof in the test volume.

Prior to the pressure reduction, the pressure at the first port (and, optionally, in the test volume) can be substantially ambient pressure; to evacuate gas from the test volume, the pressure at the first port can be reduced below ambient pressure. For example, reducing pressure can be performed such that the pressure at the first port is less than or equal to any one of, or between any two of, 0.5, 0.4, 0.3, 0.2, 0.1, or 0 atm. Greater pressure reductions can increase the amount of gas evacuated from the test volume. During gas evacuation, each of the outlet port(s) (e.g., 194) of the microfluidic network can be sealed (e.g., with a plug 234, valve, and/or the like) to prevent the inflow of gas therethrough; in other embodiments, however, the chip can have no outlet ports.

To load liquid into the test volume, pressure at the first port can be increased, optionally such that pressure at the first port is substantially ambient pressure after loading is complete. As a result, the portion of the liquid can flow to the test volume along the first flow path as described above and a plurality of droplets (e.g., 154) can be formed (FIG. 11C) in any of the above-described manners. For example, the first flow path can include, in at least one droplet-generating region, a constricting section (e.g., 62), a constant section (e.g., 66), and an expanding section (e.g., 70) as set forth above such that the portion of the liquid flows from the constricting section, to the constant section, and to the expanding section, thereby forming the droplets. Those droplets can enter the test volume; as liquid is introduced into the test volume, the pressure within the test volume can increase until it reaches substantially ambient pressure as well. By achieving pressure equalization between the test volume and the environment outside of the chip (e.g., to ambient pressure), the position of the droplets within the test volume can be maintained for analysis without the need for additional seals or other retention mechanisms. Additionally, a negative pressure gradient can result because the pressure in the test volume can be below that outside of the chip after gas evacuation—this negative pressure gradient can reinforce seals (e.g., between different pieces of the chip) to prevent chip delamination and can contain unintentional leaks by drawing gas into a leak if there is a failure. Leak containment can promote safety when, for example, the aqueous liquid includes pathogens. In other embodiments, however, the chip can be loaded without gas evacuation (e.g., by increasing pressure at the first port without decreasing pressure beforehand).

The test volume of each of the microfluidic network(s) can be loaded using any suitable system, such as, for example, system 202 of FIG. 10. To illustrate, for vacuum loading the chip can be disposed within a vacuum chamber (e.g., 202) that is at substantially atmospheric pressure. The pressure can be reduced in the vacuum chamber (e.g., at least by actuating a vacuum source (e.g., 222) and/or opening at least one of one or more control valves (e.g., 214*a*-214*d*) to permit gas withdrawal from the vacuum chamber) and thus at the first port. A fast valve (e.g., 214*b*) and a vacuum valve (e.g., 214*c*) can be opened such that the vacuum source can draw gas from the vacuum chamber at a comparatively high flow rate. To increase pressure at the first port, the vacuum chamber can be vented such that gas flows therein, e.g., by controlling one or more of the control valve(s) to permit gas (e.g., air) to enter the vacuum chamber. For example, a vent valve (e.g., 214*d*) and at least one of the slow and fast valves can be opened such that gas from the external environment (e.g., 218) flows into the vacuum chamber. The rate at which gas flows into the vacuum chamber, and thus the rate at which liquid flows toward the test volume, can be controlled using the control valve(s). To illustrate, the fast valve can be opened first such that gas flows into the vacuum chamber at a relatively high rate. When the fast valve is open, the portion of the liquid can reach the droplet generating region(s) relatively quickly. The fast valve can thereafter be closed and the slow valve can be opened such that gas flows into the vacuum chamber at a relatively lower rate. Doing so can decrease the flow rate of the portion of the liquid, which can facilitate droplet formation.

Multiple (e.g., two or more) microfluidic networks—whether defined by the same chip or by different chips—can be loaded at the same time. For example, the one or more microfluidic networks of the chip can include at least first and second microfluidic networks. First and second liquids (e.g., each comprising aqueous and non-aqueous liquids) can be disposed in the first inlet port of the first microfluidic network and the first inlet port of the second microfluidic network, respectively. At least a portion of the second liquid can be directed along the first flow path of the second microfluidic network while at least a portion of the first liquid is directed along the first flow path of the first microfluidic network (e.g., as set forth above, for each of the networks). To illustrate, during loading the chip can be disposed in a chamber (e.g., the vacuum chamber) such that the inlet ports of the microfluidic networks are both exposed to the pressure changes therein at substantially the same time. As a result, when pressure increases in the chamber, the first and second liquids can both be directed to the test volume of their respective microfluidic network.

The loading can be performed such that, for at least one of the microfluidic network(s), at least one of the droplet(s) flows from the test volume, to the gutter (e.g., 174), and, optionally, to one of the outlet port(s) and/or to a sealed reservoir as described above (FIG. 11D). If the gutter includes a trough (e.g., 172) and ridge (e.g., 176), the droplet(s) can flow across the ridge and into the trough during loading. In this manner, a portion of the droplets can form a suitable two-dimensional array in the test volume for analysis even if the test volume reaches capacity. This can facilitate loading of multiple microfluidic networks in a single chamber in which multiple inlet ports are exposed to pressure changes in the chamber at the same time—even if a test volume of one of the networks reaches capacity before the other(s), droplets in that test volume can, via the gutter, exit at an adequate rate to mitigate overlapping, stacking, and/or compression that may otherwise result from the introduction of additional droplets into the test volume as loading of the other test volume(s) is completed. As such, independent flow control need not be used when multiple microfluidic networks are loaded.

The droplets in each of the test volume(s) can be analyzed with one or more sensors (e.g., 238) that can include, for example, an imaging sensor. As an illustration, when the aqueous liquid includes a sample comprising one or more microorganisms (e.g., bacteria), each of one or more microorganisms of the sample can be encapsulated within one of the droplets. Substantially all of the encapsulating droplets (e.g., 242) can include a single microorganism (and, optionally, progeny thereof). The liquid—and thus droplets—can include a viability indicator (e.g., resazurin) that can have a particular fluorescence that varies over time depending on the interaction of the viability indicator with encapsulated microorganism(s). The imaging sensor can capture this data to, for example, identify the species of encapsulated microorganism(s). In other embodiments, however, any suitable analysis can be performed using any suitable sensor(s). The mitigated overlapping, stacking, and/or compression of droplets in the test volume—a feature facilitated by the gutter—can promote the accuracy of this analysis.

During loading and/or analysis of the droplets, the chip may be inclined (e.g., because the surface supporting the chip and/or a device holding the chip may not be level). Because of this, a bottom wall of the test volume may be inclined relative to a horizontal plane by an angle of at least 0.50, 0.75, 1.00, 1.25, 1.50, 1.75, 2.00, 2.50, 3.00, 3.50, 4.00, 4.50, or 5.00 degrees in a direction toward the gutter. With the chip inclined, the droplets may be urged toward the test volume's periphery, such as toward the outlet port(s) (e.g., due to the buoyancy thereof). The gutter's trough can impede egress of the droplets from the test volume, thereby mitigating movement of the droplets during the analysis thereof.

EXAMPLES

The present invention will be described in greater detail by way of specific examples, The following examples are offered for illustrative purposes only and are not intended to limit the invention in any manner. Those skilled in the art will readily recognize a variety of noncritical parameters that can be changed or modified to yield essentially the same results.

Example 1

Loaded, Inclined Chips Having Gutters with and without Ridges

The inclination of a loaded chip relative to a horizontal plane can result in movement of droplets within the chip's test volume that frustrates analyses requiring monitoring of individual ones of the droplets over time. Unfortunately, apparatuses for loading chips and/or the surfaces that such apparatuses rest upon may not provide for such a horizontal plane.

To investigate the impact of chip-inclination on droplet-movement and how to mitigate it, two chips were each loaded with droplets of an aqueous liquid dispersed in a non-aqueous liquid. One of the chips (FIGS. 12A-12C) included a gutter 174 without a ridge ("S1"), and the other of the chips (FIGS. 13A-13C) included a gutter 174 with a ridge 176 and a trough 172 ("S2"). Each of the chips was inclined relative to a horizontal plane and toward its respective gutter: S1 at an angle of less than 1 degree, and S2 at an angle of 5 degrees.

Figure 12A:
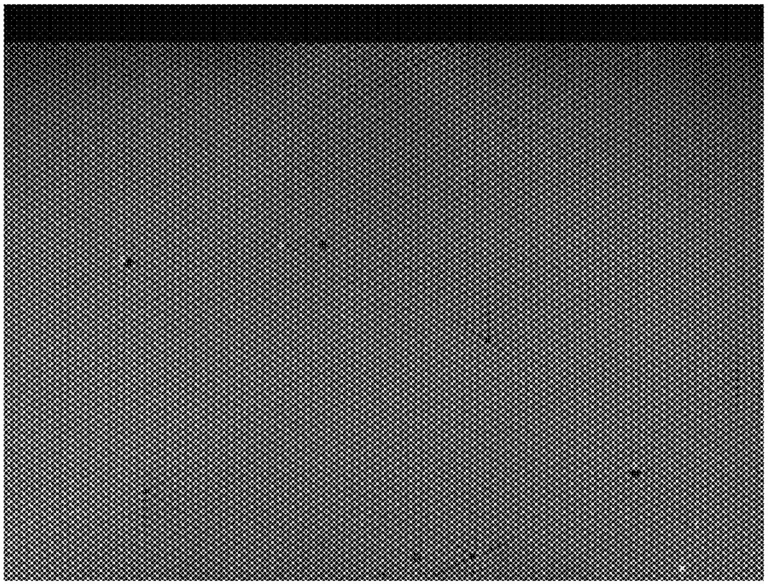
FIGS. 12A-12C are images of aqueous droplets in a chip's test volume at three consecutive times. The chip included a gutter without a ridge and was inclined at an angle of less than 1 degree. Droplets migrated to the gutter and caused the droplets in the test volume to change position.
Figure 12B:
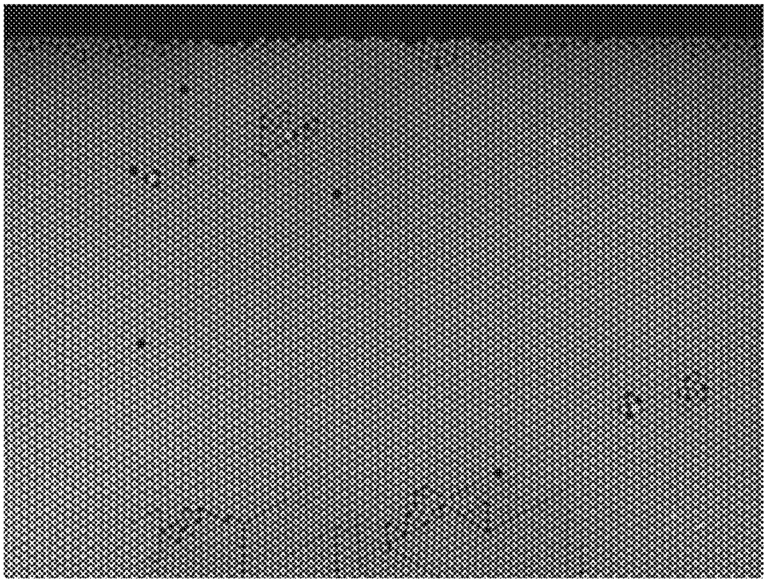
Figure 12C:
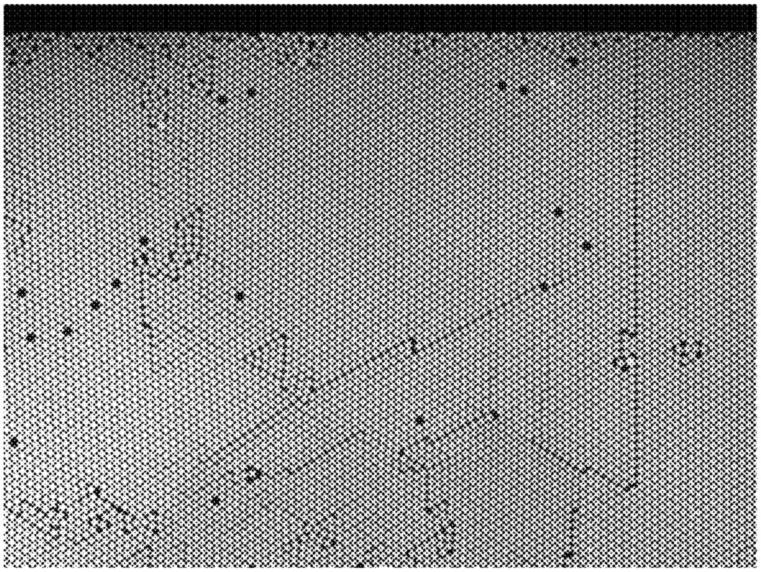
Figure 13A:
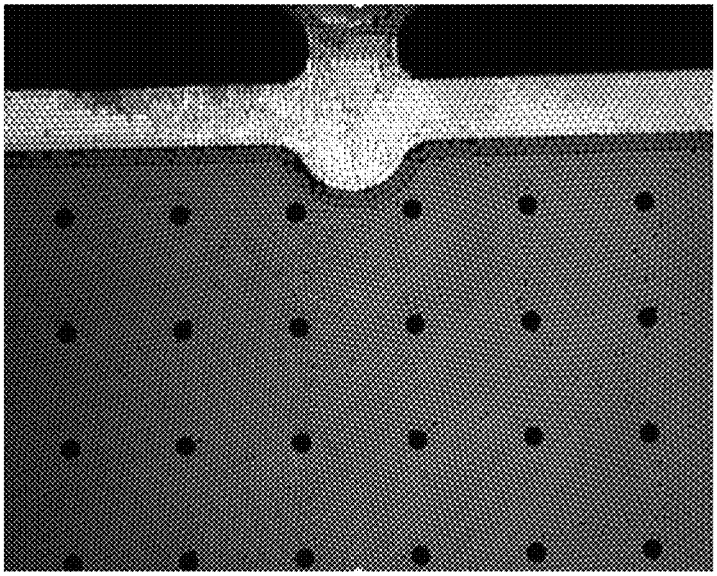
FIGS. 13A-13C are images of aqueous droplets in a chip's test volume at three consecutive times. The chip included a gutter with a ridge and was inclined at an angle of 5 degrees. The droplets in the test volume remained largely stationary.
Figure 13B:
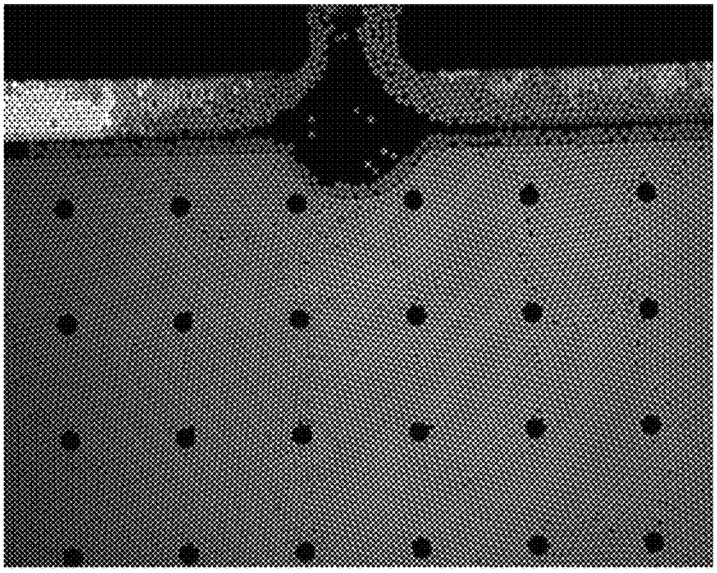
Figure 13C:
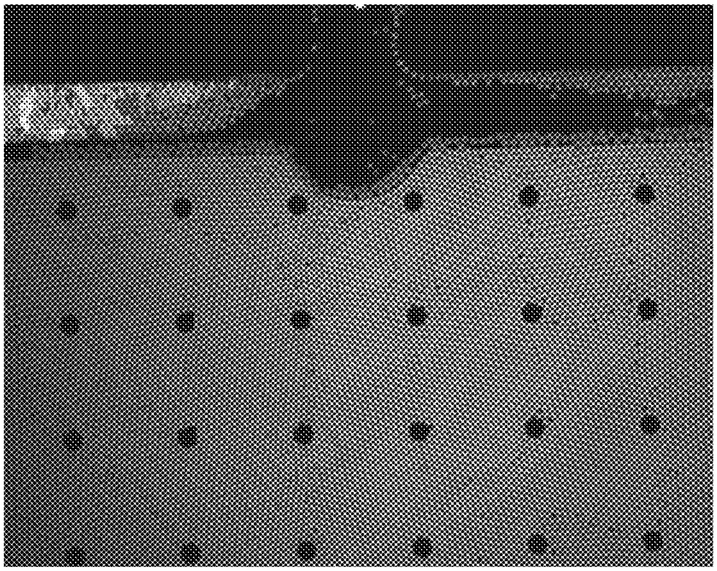

FIGS. 12A-12C depict S1 after loading—i.e., with pressure within S1's microfluidic network at ambient—at three consecutive times. As shown, even with S1's inclination of less than 1 degree toward S1's gutter 174, droplets in S1's test volume 30 migrated into the gutter, causing droplets in the test volume to change in position. In contrast, S2 after loading is shown in FIGS. 13A-13C at three consecutive times. Despite its more severe 5-degree inclination, the droplets in S2's test volume 30 remained largely stationary, facilitating droplet analyses that require monitoring of individual droplets over time.

Example 2

Loaded Chips Having Gutters with Ridges

Chips, each having a gutter (e.g., 174) with a ridge (e.g., 176) and a trough (e.g., 172), were loaded with droplets of an aqueous liquid dispersed in a non-aqueous liquid. Each of the chips had a ridge depth (e.g., 184) of 60 μm. Average droplet sizes for the chips are shown in TABLE 1 below.

TABLE 1

Average Droplet Sizes

| Chip # | Average Droplet Size (μm) |
|---|---|
| 1 | 67.48 |
| 2 | 69.53 |
| 3 | 79.12 |
| 4 | 80.34 |
| 5 | 75.46 |
| 6 | 76.21 |
| 7 | 77.08 |

Figure 14B:
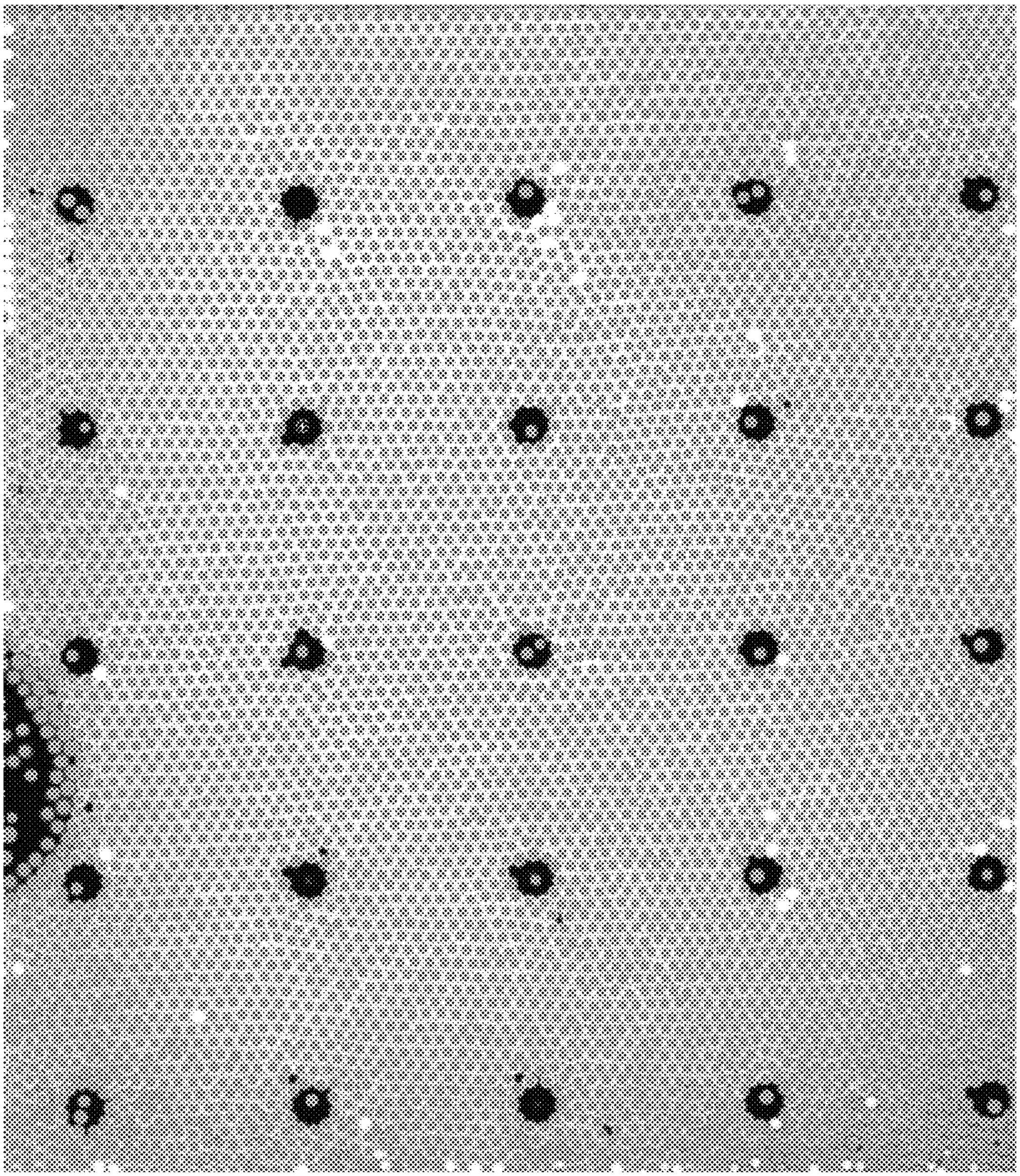
FIGS. 14A and 14B are each images of droplets in a test volume of a chip whose gutter has a ridge depth of 60 μm. The droplets were uniformly dispersed and remained relatively stationary during incubation.
Figure 14A:
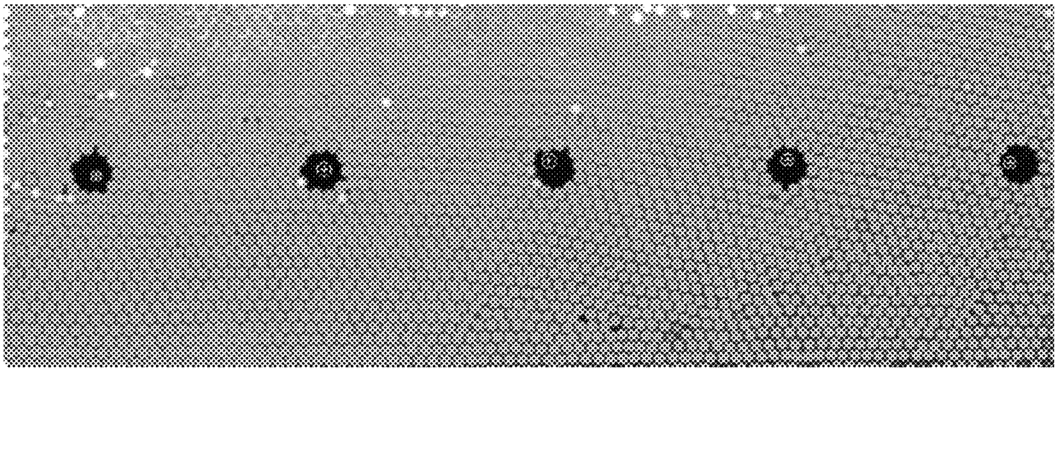

As evidenced by FIGS. 14A and 14B, which depict images of chips 2 and 4, respectively, the droplets were uniformly dispersed and remained relatively stationary during incubation.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A microfluidic chip comprising:
a body; and
a microfluidic network defined by the body, the network including:
one or more inlet ports;
a test volume having a length, a width, and a depth;
one or more flow paths extending between the inlet port(s) and the test volume, wherein, along each of the flow path(s), fluid is permitted to flow from one of the inlet port(s), through at least one droplet-generating region in which a minimum cross-sectional area of the flow path increases along the flow path, and to the test volume; and
a gutter disposed between a first surface of the body and a second surface of the body and along at least a portion of a periphery of the test volume such that fluid from the flow path(s) is not permitted to flow into the gutter without flowing through the test volume, wherein the gutter includes: a trough defining a portion of the second surface and extending away from the first surface of the body, along which the gutter has a depth that is at least 10% larger than the depth of the test volume at the periphery;
and a ridge defining a portion of the second surface and extending toward the first surface of the body, where the ridge is disposed between the trough and the test volume, the gutter having a depth along the ridge that is less than the depth of the test volume at the periphery.

2. The chip of claim 1, wherein the depth of gutter along the trough is at least 90% larger than the depth of the test volume at the periphery.

3. The chip of claim 1, wherein the gutter is disposed along at least a portion of the periphery of the test volume such that fluid from the flow path(s) is not permitted to flow into the trough without flowing past the ridge.

4. The chip of claim 1, wherein the gutter is disposed along at least a portion of the periphery of the test volume such that the gutter spans at least a majority of the width of the test volume and/or spans at least a majority of the length of the test volume.

5. The chip of claim 1, wherein the width of the test volume and the length of the test volume are each at least 10 times a maximum depth of the test volume.

6. The chip of claim 1, wherein the depth of the test volume is substantially the same across the test volume.

7. The chip of claim 1, wherein the network includes one or more outlet ports in fluid communication with the trough such that fluid is permitted to flow from the trough to the outlet port(s) without flowing through the test volume.

8. The chip of claim 1, wherein the depth of the gutter along the ridge is 90% or less of the depth of the test volume at the periphery.

9. The chip of claim 8, wherein the depth of the gutter along the ridge is at least 50% of the depth of the test volume at the periphery.

* * * * *